US009541766B2

(12) United States Patent
Harrold et al.

(10) Patent No.: US 9,541,766 B2
(45) Date of Patent: Jan. 10, 2017

(54) DIRECTIONAL DISPLAY APPARATUS

(71) Applicant: REALD INC., Beverly Hills, CA (US)

(72) Inventors: Jonathan Harrold, Leamington Spa (GB); Michael G. Robinson, Boulder, CO (US); Graham J. Woodgate, Henley on Thames (GB); Miller H. Schuck, Erie, CO (US); Adrian J. Hill, Lyons, CO (US)

(73) Assignee: RealD Spark, LLC, Beverly Hills, CA (US)

( * ) Notice: Subject to any disclaimer, the term of this patent is extended or adjusted under 35 U.S.C. 154(b) by 855 days.

(21) Appl. No.: 13/897,236

(22) Filed: May 17, 2013

(65) Prior Publication Data
US 2013/0321599 A1  Dec. 5, 2013

Related U.S. Application Data

(60) Provisional application No. 61/649,050, filed on May 18, 2012.

(51) Int. Cl.
*G02B 27/00* (2006.01)
*G02B 27/22* (2006.01)
(Continued)

(52) U.S. Cl.
CPC ......... *G02B 27/225* (2013.01); *G02B 6/0011* (2013.01); *G02B 6/0048* (2013.01); *G02B 27/22* (2013.01); *H04N 13/047* (2013.01); *H04N 13/0418* (2013.01); *H04N 13/0472* (2013.01); *H04N 13/0475* (2013.01); *H04N 13/0477* (2013.01); *H04N 13/0479* (2013.01); *H04N 13/0481* (2013.01); *G02B 6/002* (2013.01);
(Continued)

(58) Field of Classification Search
CPC .................................................... G02B 27/255
USPC ........................................................... 348/55
IPC .................................................... G02B 27/255
See application file for complete search history.

(56) References Cited

U.S. PATENT DOCUMENTS 2,133,121 A   10/1938   Stearns
2,810,905 A   10/1957   Barlow
(Continued)

FOREIGN PATENT DOCUMENTS

CN   1142869 A   2/1997
CN   1377453 A   10/2002
(Continued)

OTHER PUBLICATIONS

International search report and written opinion of international searching authority for co-pending PCT application No. PCT/US2013/041192 mailed Aug. 28, 2013.
(Continued)

*Primary Examiner* — Dave Czekaj
*Assistant Examiner* — Shanika Brumfield
(74) *Attorney, Agent, or Firm* — Penny L. Lowry; Neil G. J. Mothew

(57) ABSTRACT

Disclosed is a light guiding valve apparatus including an imaging directional backlight, an illuminator array and an observer tracking system arranged to achieve control of an array of illuminators which may provide a directional display to an observer over a wide lateral and longitudinal viewing range, wherein the number of optical windows presented to the observer as viewing windows is controlled dependent on the lateral and longitudinal position or speed of an observer.

9 Claims, 30 Drawing Sheets

(51) Int. Cl.
*F21V 8/00* (2006.01)
*H04N 13/04* (2006.01)

(52) U.S. Cl.
CPC .......... *G02B 6/0038* (2013.01); *G02B 6/0055* (2013.01); *H04N 13/0452* (2013.01); *H04N 2013/0463* (2013.01)

(56) References Cited

U.S. PATENT DOCUMENTS

| | | |
|---|---|---|
| 5,347,644 A | 9/1994 | Sedlmayr |
| 5,703,667 A | 12/1997 | Ochiai |
| 5,727,107 A | 3/1998 | Umemoto et al. |
| 5,771,066 A | 6/1998 | Barnea |
| 5,896,225 A | 4/1999 | Chikazawa |
| 5,903,388 A | 5/1999 | Sedlmayr |
| 5,959,664 A | 9/1999 | Woodgate |
| 5,971,559 A | 10/1999 | Ishikawa et al. |
| 6,014,164 A * | 1/2000 | Woodgate .......... G02B 27/0093 348/42 |
| 6,061,489 A | 5/2000 | Ezra et al. |
| 6,075,557 A | 6/2000 | Holliman et al. |
| 6,108,059 A | 8/2000 | Yang |
| 6,144,118 A | 11/2000 | Cahill et al. |
| 6,199,995 B1 | 3/2001 | Umemoto |
| 6,305,813 B1 | 10/2001 | Lekson et al. |
| 6,464,365 B1 | 10/2002 | Gunn et al. |
| 6,663,254 B2 | 12/2003 | Ohsumi |
| 6,847,488 B2 | 1/2005 | Travis |
| 6,870,671 B2 | 3/2005 | Travis |
| 6,883,919 B2 | 4/2005 | Travis |
| 7,052,168 B2 | 5/2006 | Epstein et al. |
| 7,058,252 B2 | 6/2006 | Woodgate |
| 7,073,933 B2 * | 7/2006 | Gotoh .................. G02B 6/0016 362/23.09 |
| 7,101,048 B2 * | 9/2006 | Travis ................ G02B 27/0081 345/8 |
| 7,136,031 B2 | 11/2006 | Lee et al. |
| 7,215,415 B2 | 5/2007 | Maehara |
| 7,410,286 B2 | 8/2008 | Travis |
| 7,430,358 B2 * | 9/2008 | Qi ..................... G02F 1/133606 349/64 |
| 7,528,893 B2 | 5/2009 | Schultz |
| 7,545,429 B2 | 6/2009 | Travis |
| 7,660,047 B1 | 2/2010 | Travis et al. |
| 7,750,981 B2 | 7/2010 | Shestak |
| 7,750,982 B2 | 7/2010 | Nelson |
| 7,944,428 B2 | 5/2011 | Travis |
| 7,970,246 B2 | 6/2011 | Travis et al. |
| 7,976,208 B2 | 7/2011 | Travis |
| 8,016,475 B2 | 9/2011 | Travis |
| 8,216,405 B2 | 7/2012 | Emerton |
| 8,223,296 B2 | 7/2012 | Lee et al. |
| 8,325,295 B2 | 12/2012 | Sugita |
| 8,354,806 B2 | 1/2013 | Travis |
| 8,477,261 B2 | 7/2013 | Travis |
| 8,534,901 B2 | 9/2013 | Panagotacos |
| 8,556,491 B2 | 10/2013 | Lee |
| 8,651,725 B2 | 2/2014 | Le et al. |
| 8,714,804 B2 | 5/2014 | Kim et al. |
| 9,197,884 B2 * | 11/2015 | Lee .................... H04N 13/0477 |
| 2002/0113866 A1 | 8/2002 | Taniguchi et al. |
| 2003/0137738 A1 | 7/2003 | Ozawa et al. |
| 2003/0137821 A1 | 7/2003 | Gotoh et al. |
| 2004/0108947 A1 | 6/2004 | Waldern et al. |
| 2004/0170011 A1 | 9/2004 | Kim et al. |
| 2004/0263968 A1 | 12/2004 | Kobayashi et al. |
| 2005/0135116 A1 | 6/2005 | Epstein et al. |
| 2005/0180167 A1 | 8/2005 | Hoelen et al. |
| 2005/0264717 A1 | 12/2005 | Chien et al. |
| 2005/0276071 A1 | 12/2005 | Sasagawa et al. |
| 2006/0132423 A1 | 6/2006 | Travis |
| 2006/0139447 A1 | 6/2006 | Unkrich |
| 2006/0158729 A1 | 7/2006 | Vissenberg et al. |
| 2006/0215129 A1 | 9/2006 | Alasaarela et al. |
| 2006/0269213 A1 | 11/2006 | Hwang et al. |
| 2006/0291053 A1 | 12/2006 | Robinson et al. |
| 2006/0291243 A1 | 12/2006 | Niioka et al. |
| 2007/0025680 A1 | 2/2007 | Winston et al. |
| 2007/0115552 A1 | 5/2007 | Robinson et al. |
| 2007/0188667 A1 | 8/2007 | Schwerdtner |
| 2007/0223252 A1 | 9/2007 | Lee et al. |
| 2008/0084519 A1 | 4/2008 | Brigham et al. |
| 2008/0086289 A1 | 4/2008 | Brott |
| 2008/0128728 A1 | 6/2008 | Nemchuk et al. |
| 2008/0225205 A1 | 9/2008 | Travis |
| 2008/0259012 A1 | 10/2008 | Fergason |
| 2008/0291359 A1 | 11/2008 | Miyashita |
| 2008/0297459 A1 | 12/2008 | Sugimoto et al. |
| 2008/0304282 A1 | 12/2008 | Mi et al. |
| 2008/0316768 A1 | 12/2008 | Travis |
| 2009/0016057 A1 | 1/2009 | Rinko |
| 2009/0067156 A1 | 3/2009 | Bonnett et al. |
| 2009/0140656 A1 | 6/2009 | Kohashikawa et al. |
| 2009/0160757 A1 | 6/2009 | Robinson |
| 2009/0190072 A1 | 7/2009 | Nagata et al. |
| 2009/0190079 A1 | 7/2009 | Saitoh |
| 2009/0225380 A1 | 9/2009 | Schwerdtner et al. |
| 2009/0278936 A1 | 11/2009 | Pastoor et al. |
| 2010/0053771 A1 | 3/2010 | Travis |
| 2010/0091254 A1 | 4/2010 | Travis |
| 2010/0165598 A1 | 7/2010 | Chen et al. |
| 2010/0177387 A1 | 7/2010 | Travis |
| 2010/0188438 A1 | 7/2010 | Kang |
| 2010/0188602 A1 | 7/2010 | Feng |
| 2010/0214135 A1 | 8/2010 | Bathiche |
| 2010/0220260 A1 | 9/2010 | Sugita et al. |
| 2010/0231498 A1 | 9/2010 | Large |
| 2010/0277575 A1 | 11/2010 | Ismael et al. |
| 2010/0278480 A1 | 11/2010 | Vasylyev |
| 2010/0295930 A1 | 11/2010 | Ezhov |
| 2010/0300608 A1 | 12/2010 | Emerton et al. |
| 2011/0032483 A1 | 2/2011 | Hiruska et al. |
| 2011/0044056 A1 | 2/2011 | Travis |
| 2011/0044579 A1 | 2/2011 | Travis et al. |
| 2011/0051237 A1 | 3/2011 | Hasegawa et al. |
| 2011/0187293 A1 | 8/2011 | Travis |
| 2011/0188120 A1 | 8/2011 | Tabirian et al. |
| 2011/0216266 A1 | 9/2011 | Travis |
| 2011/0221998 A1 | 9/2011 | Adachi et al. |
| 2011/0242298 A1 | 10/2011 | Bathiche |
| 2011/0255303 A1 | 10/2011 | Nichol et al. |
| 2011/0285927 A1 | 11/2011 | Schultz et al. |
| 2011/0310232 A1 | 12/2011 | Wilson et al. |
| 2012/0002136 A1 | 1/2012 | Nagata et al. |
| 2012/0013720 A1 | 1/2012 | Kadowaki et al. |
| 2012/0127573 A1 | 5/2012 | Robinson et al. |
| 2012/0243204 A1 | 9/2012 | Robinson |
| 2013/0101253 A1 | 4/2013 | Popovich et al. |
| 2013/0135588 A1 | 5/2013 | Popovich et al. |

FOREIGN PATENT DOCUMENTS

| | | |
|---|---|---|
| CN | 1454329 A | 11/2003 |
| CN | 1466005 A | 1/2004 |
| CN | 1696788 A | 11/2005 |
| CN | 1823292 A | 8/2006 |
| CN | 1826553 A | 8/2006 |
| EP | 0939273 | 1/1999 |
| EP | 0656555 B1 | 3/2003 |
| EP | 0860729 B1 | 7/2006 |
| EP | 2003394 | 12/2008 |
| EP | 2451180 A2 | 5/2012 |
| JP | 08-237691 A | 9/1996 |
| JP | 08254617 A | 10/1996 |
| JP | 08340556 A | 12/1996 |
| JP | 2000-200049 A | 7/2000 |
| JP | 2001093321 A | 4/2001 |
| JP | 2002049004 A | 2/2002 |
| JP | 2003-215705 A | 7/2003 |
| JP | 2004319364 A | 11/2004 |
| JP | 2005135844 A | 5/2005 |
| JP | 2005183030 | 7/2005 |
| JP | 2005-259361 A | 9/2005 |

(56) References Cited

FOREIGN PATENT DOCUMENTS

| | | |
|---|---|---|
| JP | 2006004877 | 1/2006 |
| JP | 2006031941 A | 2/2006 |
| JP | 3968742 B2 | 8/2007 |
| JP | 2007-273288 | 10/2007 |
| JP | 2008204874 A | 9/2008 |
| JP | 2010160527 A | 7/2010 |
| KR | 1020030064258 | 7/2003 |
| KR | 10-0932304 B1 | 12/2009 |
| KR | 1020110006773 A | 1/2011 |
| KR | 1020110017918 A | 2/2011 |
| KR | 1020110067534 A | 6/2011 |
| KR | 10-2012-004989 A | 5/2012 |
| KR | 1020120048301 A | 5/2012 |
| TW | 200528780 A | 9/2005 |
| WO | 9527915 A1 | 10/1995 |
| WO | 2001-061241 A1 | 8/2001 |

OTHER PUBLICATIONS

International search report and written opinion of international searching authority for co-pending PCT application No. PCT/US2013/041619 mailed Aug. 27, 2013.
International search report and written opinion of international searching authority for co-pending PCT application No. PCT/US2013/041655 mailed Aug. 27, 2013.
International search report and written opinion of international searching authority for co-pending PCT application No. PCT/US2013/041703 mailed Aug. 27, 2013.
International search report and written opinion of international searching authority for co-pending PCT application No. PCT/US2013/041548 mailed Aug. 27, 2013.
International search report and written opinion of international searching authority for co-pending PCT application No. PCT/US2013/041683 mailed Aug. 27, 2013.
International search report and written opinion of international searching authority for co-pending PCT application No. PCT/US2013/041228 mailed Aug. 23, 2013.
International search report and written opinion of international searching authority for co-pending PCT application No. PCT/US2013/041235 mailed Aug. 23, 2013.
International search report and written opinion of international searching authority for co-pending PCT application No. PCT/US2013/041697 mailed Aug. 23, 2013.
Tabiryan et al., "The Promise of Diffractive Waveplates," Optics and Photonics News, vol. 21, Issue 3, pp. 40-45 (Mar. 2010).
International search report and written opinion of international searching authority in PCT/US2012/042279 dated Feb. 26, 2013.
International search report and written opinion of international searching authority in PCT/US2012/037677 dated Jun. 29, 2012.
International search report and written opinion of international searching authority in PCT/US2011/061511 dated Jun. 29, 2012.
Kalantar, et al. "Backlight Unit With Double Surface Light Emission," J. Soc. Inf. Display, vol. 12, Issue 4, pp. 379-387 (Dec. 2004).
International search report and written opinion of the international searching authority from PCT/US12/052189 dated Jan. 29, 2013.
International Preliminary Report on Patentability in PCT/US2011/061511 dated May 21, 2013.
Travis, et al. "Backlight for view-sequential autostereo 3D".
International search report and written opinion of international searching authority for PCT application PCT/US2013/063133 mailed Jan. 20, 2014.
International search report and written opinion of international searching authority for PCT application PCT/US2013/063125 mailed Jan. 20, 2014.
International search report and written opinion of international searching authority for PCT application PCT/US2013/077288 mailed Apr. 18, 2014.
International search report and written opinion of international searching authority for PCT application PCT/US2014/017779 mailed May 28, 2014.
201380026050.0 Chinese 1st Office Action of the State Intellectual Property Office of P.R. dated Jun. 3, 2016.
201380026076.5 Chinese first office action dated May 11, 2016.
Extended European Search Report from European Patent Application No. 13791437.0 dated Oct. 14, 2015.
13791437.0 European first office action dated Aug. 30, 2016.

* cited by examiner

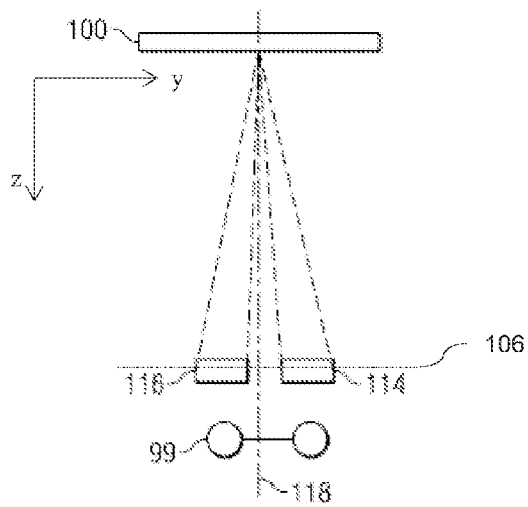
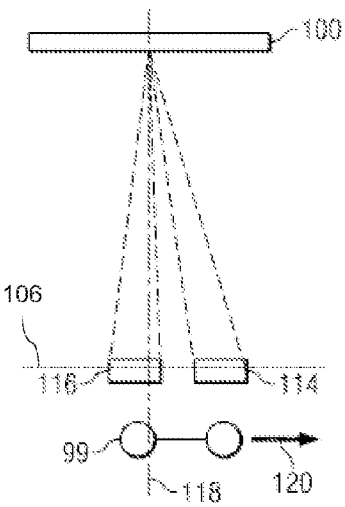
*FIG. 14A*    *FIG. 14B*
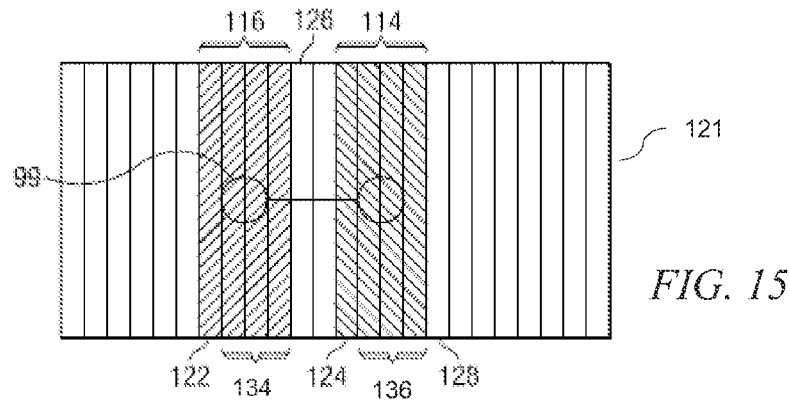
*FIG. 15*
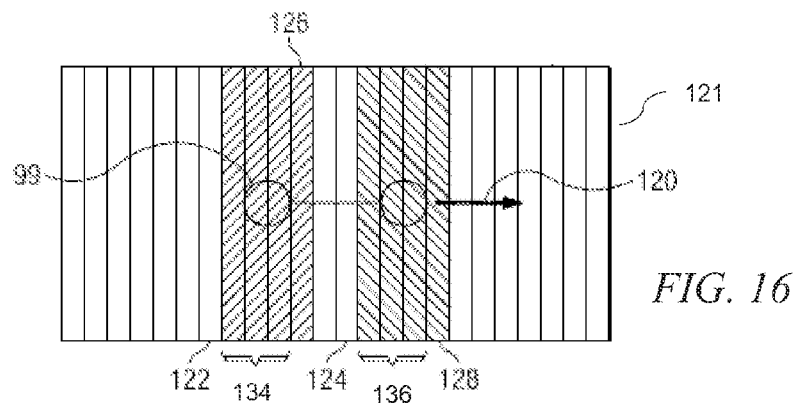
*FIG. 16*

DIRECTIONAL DISPLAY APPARATUS

CROSS-REFERENCE TO RELATED APPLICATIONS

This application claims priority to U.S. Provisional Patent Application No. 61/649,050, entitled "Control System for a directional light source," filed May 18, 2012, which is herein incorporated by reference in its entirety.

TECHNICAL FIELD

This disclosure generally relates to illumination of light modulation devices, and more specifically relates to light guides for providing large area illumination from localized light sources for use in 2D, 3D, and/or autostereoscopic display devices.

BACKGROUND

Spatially multiplexed autostereoscopic displays typically align a parallax component such as a lenticular screen or parallax barrier with an array of images arranged as at least first and second sets of pixels on a spatial light modulator, for example an LCD. The parallax component directs light from each of the sets of pixels into different respective directions to provide first and second viewing windows in front of the display. An observer with an eye placed in the first viewing window can see a first image with light from the first set of pixels; and with an eye placed in the second viewing window can see a second image, with light from the second set of pixels.

Such displays have reduced spatial resolution compared to the native resolution of the spatial light modulator and further, the structure of the viewing windows is determined by the pixel aperture shape and parallax component imaging function. Gaps between the pixels, for example for electrodes, typically produce non-uniform viewing windows. Undesirably such displays exhibit image flicker as an observer moves laterally with respect to the display and so limit the viewing freedom of the display. Such flicker can be reduced by defocusing the optical elements; however such defocusing results in increased levels of image cross talk and increases visual strain for an observer. Such flicker can be reduced by adjusting the shape of the pixel aperture, however such changes can reduce display brightness and can comprise addressing electronics in the spatial light modulator.

BRIEF SUMMARY

According to a first aspect of the present disclosure, there is provided a directional display apparatus including a display device which may include a transmissive spatial light modulator. The transmissive spatial light modulator may include an array of pixels which may be arranged to modulate light passing therethrough. The display device may also include a waveguide having an input end and first and second opposed guide surfaces for guiding light along the waveguide. The first and second opposed guide surfaces may extend from the input end across the spatial light modulator. The display device may also include an array of light sources at different input positions in a lateral direction across the input end of the waveguide. The waveguide may be arranged to direct input light from light sources at the different input positions across the input end, as output light through the first guide surface for supply through the spatial light modulator into respective optical windows in output directions distributed in the lateral direction in dependence on the input positions. The autostereoscopic display apparatus may also include a sensor system which may be arranged to detect the position of an observer relative to the display device and a control system which may be arranged to operate the light sources to direct light into one or more viewing windows including at least one optical window, in dependence on the detected position of the observer. The control system may be arranged to change the number of optical windows of the one or more viewing windows on the basis of the output of the sensor system.

By changing the number of optical windows used to form a viewing window, the directional display apparatus may achieve a desirable balance between reduction of display flicker and control of power consumption.

The directional display apparatus may be an autostereoscopic display apparatus in which the control system is further arranged to control the spatial light modulator to modulate light with temporally multiplexed left and right images and is arranged synchronously to operate the light sources to direct light modulated by the left and right images into left and right eye viewing windows comprising at least one optical window in positions corresponding to left and right eyes of an observer, in dependence on the detected position of the observer. In that case, changing the number of optical windows used to form a viewing window may reduce display flicker while substantially maintaining reduced image cross talk.

The control of the number of optical windows in a viewing window may be based on the output of the sensor system in a variety of ways, some examples of which are as follows.

The control system may change the number of optical windows of the one or more viewing windows in response to the detected position of the observer in the lateral direction, for example by increasing the number of optical windows in response to the detected position of the observer being in a position displaced in the lateral direction away from the normal to the display device by a predetermined amount.

The control system may change the number of optical windows of the one or more viewing windows in response to the detected position of the observer along the normal to the display device, for example by increasing the number of optical windows in response to the detected position of the observer being in a position displaced along the normal to the display device away from a nominal window plane by a predetermined amount towards the display device.

The control system may change the number of optical windows of the one or more viewing windows in response to the speed or acceleration of the observer in the lateral direction from the normal to the display device, for example by increasing the number of optical windows in response to the speed or acceleration of the observer in the lateral direction from the normal to the display device exceeding a predetermined amount.

According to a second aspect of the present disclosure, there is provided an autostereoscopic display apparatus which may include a display device including: a transmissive spatial light modulator comprising an array of pixels arranged to modulate light passing therethrough. The display device may also include a waveguide having an input end and first and second, opposed guide surfaces for guiding light along the waveguide that extend from the input end across the spatial light modulator. The display device may also include an array of light sources at different input positions in a lateral direction across the input end of the waveguide. The waveguide may be arranged to direct input light from light sources at the different input positions across the input end as output light through the first guide surface for supply through the spatial light modulator into respective optical windows in output directions distributed in the lateral direction in dependence on the input positions. The autostereoscopic display apparatus may further include a sensor system arranged to detect the position of an observer relative to the display device. The autostereoscopic display apparatus may further include a control system arranged to control the spatial light modulator and to operate the light sources to direct light into viewing windows comprising at least one optical window in positions corresponding to left and right eyes of an observer, in dependence on the detected position of the observer. The control system may be arranged to provide a 3D image display in response to the detected position of the observer being in a central region of lateral positions around the normal to the display device by controlling the spatial light modulator to modulate light with temporally multiplexed left and right images and synchronously operating the light sources to direct the left and right images into the viewing windows in positions corresponding to left and right eyes of an observer. The control system may further be arranged to provide 2D image display in response to the detected position of the observer being in a lateral position outside the central range, by controlling the spatial light modulator to modulate light with a 2D image and operating the light sources to direct that 2D image into the viewing windows in positions corresponding to left and right eyes of an observer.

In one embodiment, the optical window distortion may increase off-axis due to optical aberrations for example, which may create non uniformities of illumination in non-compensated arrangements. The number of optical windows that may be illuminated may be increased for off-axis viewing positions to compensate for window distortion so that the display area remains substantially uniformly filled for the respective eyes of an observer in off-axis viewing positions.

Additionally, increasing the size of the optical window array at or near to the edge of the viewing region may somewhat compensate for the aberrations of the optical window images and may reduce the appearance of unwanted image flicker, particularly due to the appearance of field aberrations at the output of the optical system.

By way of comparison, wider window width may be achieved than can be conveniently achieved in spatially multiplexed displays without increasing the overlap between windows in the interocular region. The window width may be varied to increase the viewing freedom in the longitudinal direction towards and away from the display, as well as laterally with respect to the optical axis of the display In a similar manner to previously described, the size of the viewing window may be adjusted during longitudinal tracking to increase viewing freedom. Advantageously reduced cross talk near to the window plane may be achieved by smaller viewing windows, whereas for viewing distances away from the window plane, further optical windows may be illuminated to enhance longitudinal viewing freedom and provide larger viewing windows. The switching of the optical windows between the observer locations may be achieved by control of discrete light emitting elements. To note, the number of optical windows constituting a viewing window may be adjusted without reducing the spatial resolution of the display.

One embodiment may provide a substantially seamless transition between autostereoscopic viewing and 2D viewing beyond the position limits of autostereoscopic viewing with desirable image quality.

Additionally, a mechanism as discussed herein may be used to switch to 2D (non autostereoscopic) viewing before an observer location is reached in a longitudinal or lateral direction, if for example, the system aberrations increase to an extent that the display illumination uniformity or image cross talk fall below desirable limits of observer comfort.

In another embodiment, a display may process the user location to turn on an additional 2D backlight when the observer is within a location range in front of the display, so that the edges of the display may remain illuminated and the comfortable viewing freedom further increased.

In yet another embodiment, an eccentrically weighted motor may be employed when the observer approaches a defined position such as the limit of viewing freedom. The weighted motor may include a vibration mode that may work well with displays that are hand held or that may be operated from a hand held console or device. Furthermore, the device for detecting the observer location may also be used to notify the observer that the desirable range for autostereoscopic viewing has been exceeded.

An autostereoscopic display with 2D viewing regions outside an autostereoscopic 3D viewing region is an alternative to providing no light outside the respective viewing 3D viewing region. The display may achieve a wide viewing freedom that ensures that when 3D is viewed the images are of desirable image quality.

Additionally, this embodiment may achieve two different 2D image channels to be viewed over the whole screen simultaneously for two different observers, or different views in different spatial positions for the same observer.

Any of the described aspects of the present disclosure may be applied together in any combination.

Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in patent application Ser. No. 13/300,293, which is herein incorporated by reference, in its entirety.

U.S. Pat. No. 6,377,295, which is herein incorporated by reference in its entirety, generally discusses that prediction can be used to correct coordinates due to latency in tracking control. This is applied to a mechanically moved parallax optical element, the position of which must be controlled at all times or continuously. By way of comparison the present embodiments provide a predictive generation of the observer location, rather than the tracker latency, at a defined future time set by the display illumination pulses. Advantageously it may not be appropriate to determine locations continuously, but instead at discrete future times of the illumination. U.S. Pat. No. 5,959,664, which is herein incorporated by reference in its entirety, generally discusses longitudinal tracking of an observer and steering by adjusting the content of the display SLM. By way of comparison embodiments described below may achieve longitudinal tracking by adjusting the illumination of the optical valve without adjusting or slicing of the image on the display SLM.

Embodiments herein may provide an autostereoscopic display with large area and thin structure. Further, as will be described, the optical valves of the present disclosure may achieve thin optical components with large back working distances. Such components can be used in directional backlights, to provide directional displays including autostereoscopic displays. Further, embodiments may provide a controlled illuminator for the purposes of an efficient autostereoscopic display.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is only provided over a small angular directional distribution; alternating left and right eye viewing for time sequential stereoscopic and autostereoscopic display; and low cost.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 14A is a schematic diagram illustrating in front view, a first viewing window arrangement, in accordance with the present disclosure;

FIG. 14B is a schematic diagram illustrating in front view, a second viewing window arrangement for a moving observer, in accordance with the present disclosure;

FIG. 15 is a schematic diagram illustrating the appearance of windows of FIG. 14A in the window plane, in accordance with the present disclosure;

FIG. 16 is a schematic diagram illustrating the appearance of windows of FIG. 14B in the window plane for a moving observer, in accordance with the present disclosure;

DETAILED DESCRIPTION

Figure 1A:
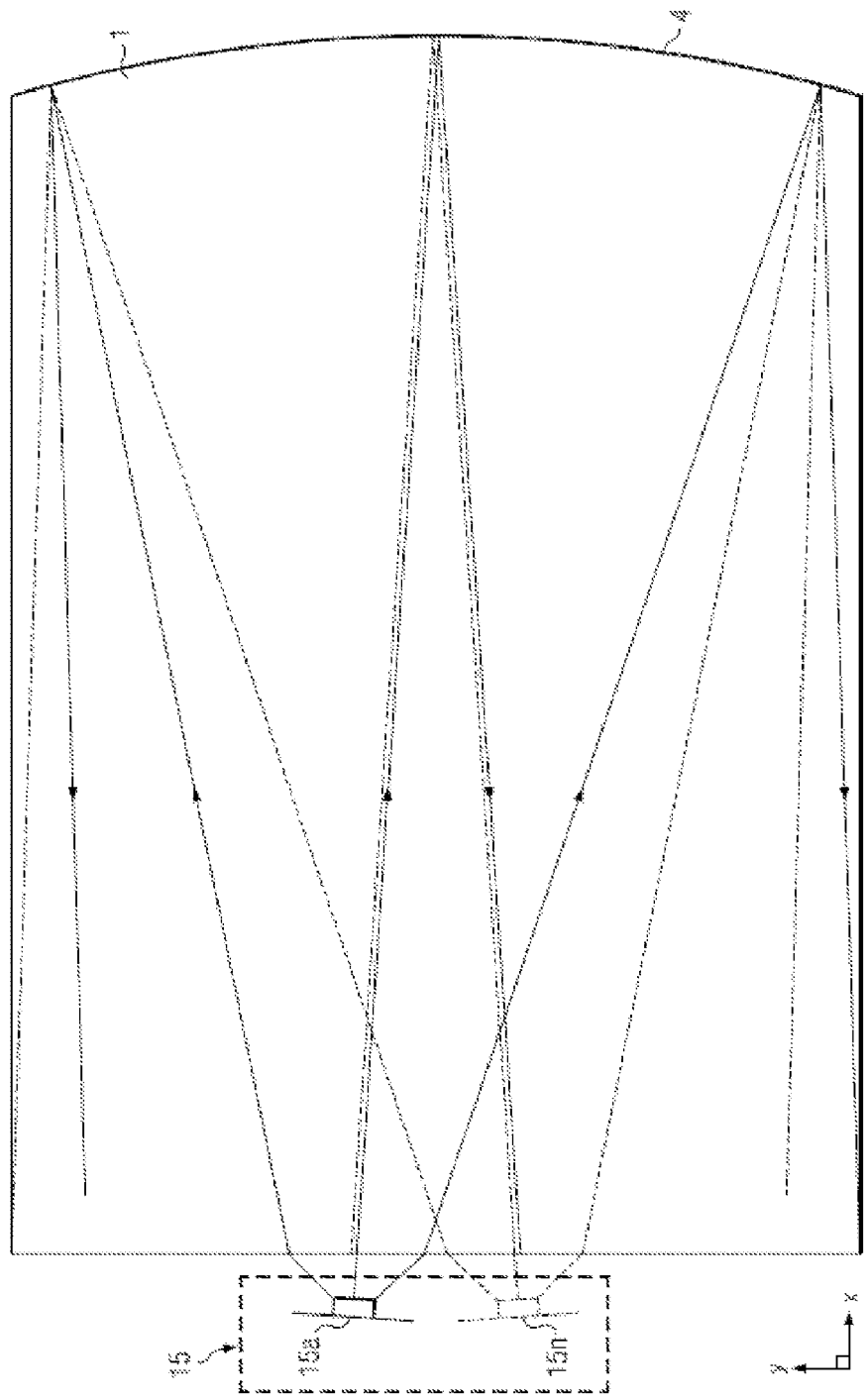
FIG. 1A is a schematic diagram illustrating a front view of light propagation in one embodiment of a directional display device, in accordance with the present disclosure.

Time multiplexed autostereoscopic displays can advantageously improve the spatial resolution of autostereoscopic display by directing light from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display over multiple time slots. Time multiplexed displays can advantageously achieve directional illumination by directing an illuminator array through a substantially transparent time multiplexed spatial light modulator using directional optical elements, wherein the directional optical elements substantially form an image of the illuminator array in the window plane.

The uniformity of the viewing windows may be advantageously independent of the arrangement of pixels in the spatial light modulator. Advantageously, such displays can provide observer tracking displays which have low flicker, with low levels of cross talk for a moving observer.

To achieve high uniformity in the window plane, it is desirable to provide an array of illumination elements that have a high spatial uniformity. The illuminator elements of the time sequential illumination system may be provided, for example, by pixels of a spatial light modulator with size approximately 100 micrometers in combination with a lens array. However, such pixels suffer from similar difficulties as for spatially multiplexed displays. Further, such devices may have low efficiency and higher cost, requiring additional display components.

High window plane uniformity can be conveniently achieved with macroscopic illuminators, for example, an array of LEDs in combination with homogenizing and diffusing optical elements that are typically of size 1 mm or greater. However, the increased size of the illuminator elements means that the size of the directional optical elements increases proportionately. For example, a 16 mm wide illuminator imaged to a 65 mm wide viewing window may require a 200 mm back working distance. Thus, the increased thickness of the optical elements can prevent useful application, for example, to mobile displays, or large area displays.

Addressing the aforementioned shortcomings, optical valves as described in commonly-owned U.S. patent application Ser. No. 13/300,293 advantageously can be arranged in combination with fast switching transmissive spatial light modulators to achieve time multiplexed autostereoscopic illumination in a thin package while providing high resolution images with flicker free observer tracking and low levels of cross talk. Described is a one dimensional array of viewing positions, or windows, that can display different images in a first, typically horizontal, direction, but contain the same images when moving in a second, typically vertical, direction.

Conventional non-imaging display backlights commonly employ optical waveguides and have edge illumination from light sources such as LEDs. However, it should be appreciated that there are many fundamental differences in the function, design, structure, and operation between such conventional non-imaging display backlights and the imaging directional backlights discussed in the present disclosure.

Generally, for example, in accordance with the present disclosure, imaging directional backlights are arranged to direct the illumination from multiple light sources through a display panel to respective multiple viewing windows in at least one axis. Each viewing window is substantially formed as an image in at least one axis of a light source by the imaging system of the imaging directional backlight. An imaging system may be formed between multiple light sources and the respective window images. In this manner, the light from each of the multiple light sources is substantially not visible for an observer's eye outside of the respective viewing window.

In contradistinction, conventional non-imaging backlights or light guiding plates (LGPs) are used for illumination of 2D displays. See, e.g., Käilil Käläntar et al., *Backlight Unit With Double Surface Light Emission*, J. Soc. Inf. Display, Vol. 12, Issue 4, pp. 379-387 (December 2004). Non-imaging backlights are typically arranged to direct the illumination from multiple light sources through a display panel into a substantially common viewing zone for each of the multiple light sources to achieve wide viewing angle and high display uniformity. Thus non-imaging backlights do not form viewing windows. In this manner, the light from each of the multiple light sources may be visible for an observer's eye at substantially all positions across the viewing zone. Such conventional non-imaging backlights may have some directionality, for example, to increase screen gain compared to Lambertian illumination, which may be provided by brightness enhancement films such as BEF™ from 3M. However, such directionality may be substantially the same for each of the respective light sources. Thus, for these reasons and others that should be apparent to persons of ordinary skill, conventional non-imaging backlights are different to imaging directional backlights. Edge lit non-imaging backlight illumination structures may be used in liquid crystal display systems such as those seen in 2D Laptops, Monitors and TVs. Light propagates from the edge of a lossy waveguide which may include sparse features; typically local indentations in the surface of the guide which cause light to be lost regardless of the propagation direction of the light.

As used herein, an optical valve is an optical structure that may be a type of light guiding structure or device referred to as, for example, a light valve, an optical valve directional backlight, and a valve directional backlight ("v-DBL"). In the present disclosure, optical valve is different to a spatial light modulator (which is sometimes referred to as a "light valve"). One example of an imaging directional backlight is an optical valve that may employ a folded optical system. Light may propagate substantially without loss in one direction through the optical valve, may be incident on an imaging reflector, and may counter-propagate such that the light may be extracted by reflection off tilted light extraction features, and directed to viewing windows as described in U.S. patent application Ser. No. 13/300,293, which is herein incorporated by reference in its entirety.

As used herein, examples of an imaging directional backlight include a stepped waveguide imaging directional backlight, a folded imaging directional backlight, a wedge type directional backlight, or an optical valve.

Additionally, as used herein, a stepped waveguide imaging directional backlight may be an optical valve. A stepped waveguide is a waveguide for an imaging directional backlight comprising a waveguide for guiding light, which may include a first light guiding surface and a second light guiding surface, opposite the first light guiding surface, further comprising a plurality of light guiding features interspersed with a plurality of extraction features arranged as steps.

Moreover, as used, a folded imaging directional backlight may be at least one of a wedge type directional backlight, or an optical valve.

In operation, light may propagate within an exemplary optical valve in a first direction from an input end to a reflective end and may be transmitted substantially without loss. Light may be reflected at the reflective end and propagates in a second direction substantially opposite the first direction. As the light propagates in the second direction, the light may be incident on light extraction features, which are operable to redirect the light outside the optical valve. Stated differently, the optical valve generally allows light to propagate in the first direction and may allow light to be extracted while propagating in the second direction.

The optical valve may achieve time sequential directional illumination of large display areas. Additionally, optical elements may be employed that are thinner than the back working distance of the optical elements to direct light from macroscopic illuminators to a nominal window plane. Such displays may use an array of light extraction features arranged to extract light counter propagating in a substantially parallel waveguide.

Thin imaging directional backlight implementations for use with LCDs have been proposed and demonstrated by 3M, for example U.S. Pat. No. 7,528,893; by Microsoft, for example U.S. Pat. No. 7,970,246 which may be referred to herein as a "wedge type directional backlight;" by RealD, for example U.S. patent application Ser. No. 13/300,293 which may be referred to herein as an "optical valve" or "optical valve directional backlight," all of which are herein incorporated by reference in their entirety.

The present disclosure provides stepped waveguide imaging directional backlights in which light may reflect back and forth between the internal faces of, for example, a stepped waveguide which may include a first side and a first set of features. As the light travels along the length of the stepped waveguide, the light may not substantially change angle of incidence with respect to the first side and first set of surfaces and so may not reach the critical angle of the medium at these internal faces. Light extraction may be advantageously achieved by a second set of surfaces (the step "risers") that are inclined to the first set of surfaces (the step "treads"). Note that the second set of surfaces may not be part of the light guiding operation of the stepped waveguide, but may be arranged to provide light extraction from the structure. By contrast, a wedge type imaging directional backlight may allow light to guide within a wedge profiled waveguide having continuous internal surfaces. The optical valve is thus not a wedge type imaging directional backlight.

Figure 1B:
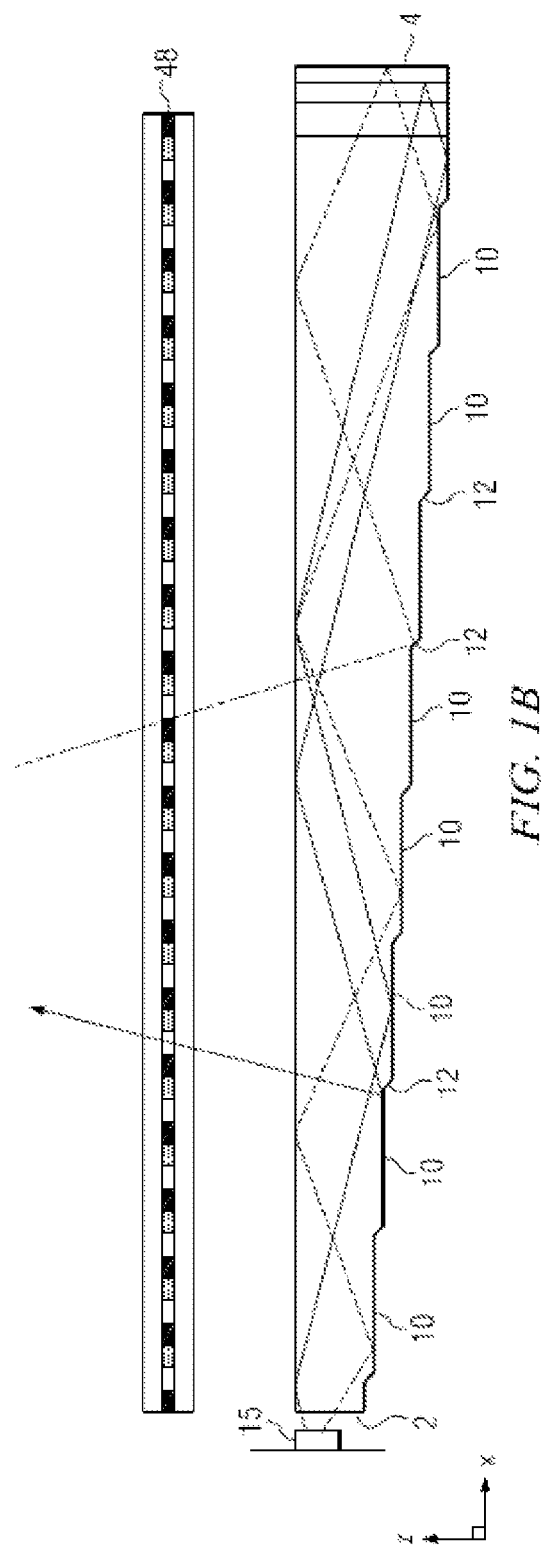
FIG. 1B is a schematic diagram illustrating a side view of light propagation in one embodiment of the directional display device of FIG. 1A, in accordance with the present disclosure.

FIG. 1A is a schematic diagram illustrating a front view of light propagation in one embodiment of a directional display device, and FIG. 1B is a schematic diagram illustrating a side view of light propagation in the optical valve structure of FIG. 1A.

FIG. 1A illustrates a front view in the xy plane of a directional backlight of a directional display device, and includes an illuminator array 15 which may be used to illuminate a stepped waveguide 1. Illuminator array 15 includes illuminator elements 15a through illuminator element 15n (where n is an integer greater than one). In one example, the stepped waveguide 1 of FIG. 1A may be a stepped, display sized waveguide 1. Illuminator elements 15a through 15n are light sources that may be light emitting diodes (LEDs). Although LEDs are discussed herein as illuminator elements 15a-15n, other light sources may be used such as, but not limited to, diode sources, semiconductor sources, laser sources, local field emission sources, organic emitter arrays, and so forth. Additionally, FIG. 1B illustrates a side view in the xz plane, and includes illuminator array 15, SLM (spatial light modulator) 48, extraction features 12, guiding features 10, and stepped waveguide 1, arranged as shown. The side view provided in FIG. 1B is an alternative view of the front view shown in FIG. 1A. Accordingly, the illuminator array 15 of FIGS. 1A and 1B corresponds to one another and the stepped waveguide 1 of FIGS. 1A and 1B may correspond to one another.

Further, in FIG. 1B, the stepped waveguide 1 may have an input end 2 that is thin and a reflective end 4 that is thick. Thus the waveguide 1 extends between the input end 2 that receives input light and the reflective end 4 that reflects the input light back through the waveguide 1. The length of the input end 2 in a lateral direction across the waveguide is greater than the height of the input end 2. The illuminator elements 15a-15n are disposed at different input positions in a lateral direction across the input end 2.

The waveguide 1 has first and second, opposed guide surfaces extending between the input end 2 and the reflective end 4 for guiding light forwards and back along the waveguide 1 by total internal reflection. The first guide surface is planar. The second guide surface has a plurality of light extraction features 12 facing the reflective end 4 and inclined to reflect at least some of the light guided back through the waveguide 1 from the reflective end in directions that break the total internal reflection at the first guide surface and allow output through the first guide surface, for example, upwards in FIG. 1B, that is supplied to the SLM 48.

In this example, the light extraction features 12 are reflective facets, although other reflective features could be used. The light extraction features 12 do not guide light through the waveguide, whereas the intermediate regions of the second guide surface intermediate the light extraction features 12 guide light without extracting it. Those regions of the second guide surface are planar and may extend parallel to the first guide surface, or at a relatively low inclination. The light extraction features 12 extend laterally to those regions so that the second guide surface has a stepped shape including the light extraction features 12 and intermediate regions. The light extraction features 12 are oriented to reflect light from the light sources, after reflection from the reflective end 4, through the first guide surface.

The light extraction features 12 are arranged to direct input light from different input positions in the lateral direction across the input end in different directions relative to the first guide surface that are dependent on the input position. As the illumination elements 15a-15n are arranged at different input positions, the light from respective illumination elements 15a-15n is reflected in those different directions. In this manner, each of the illumination elements 15a-15n directs light into a respective optical window in output directions distributed in the lateral direction in dependence on the input positions. The lateral direction across the input end 2 in which the input positions are distributed corresponds with regard to the output light to a lateral direction to the normal to the first guide surface. The lateral directions as defined at the input end 2 and with regard to the output light remain parallel in this embodiment where the deflections at the reflective end 4 and the first guide surface are generally orthogonal to the lateral direction. Under the control of a control system, the illuminator elements 15a-15n may be selectively operated to direct light into a selectable optical window.

In the present disclosure an optical window may correspond to the image of a single light source in the window plane, being a nominal plane in which optical windows form across the entirety of the display device. Alternatively, an optical windows may correspond to the image of a groups of light sources that are driven together. Advantageously, such groups of light sources may increase uniformity of the optical windows of the array 121.

By way of comparison, a viewing window is a region in the window plane wherein light is provided comprising image data of substantially the same image from across the display area. Thus a viewing window may be formed from a single optical window or from plural optical windows.

The SLM 48 extends across the waveguide is transmissive and modulates the light passing therethrough. Although the SLM 48 may be a liquid crystal display (LCD) but this is merely by way of example, and other spatial light modulators or displays may be used including LCOS, DLP devices, and so forth, as this illuminator may work in reflection. In this example, the SLM 48 is disposed across the first guide surface of the waveguide and modulates the light output through the first guide surface after reflection from the light extraction features 12.

The operation of a directional display device that may provide a one dimensional array of viewing windows is illustrated in front view in FIG. 1A, with its side profile shown in FIG. 1B. In operation, in FIGS. 1A and 1B, light may be emitted from an illuminator array 15, such as an array of illuminator elements 15a through 15n, located at different positions, y, along the surface of thin end side 2, x=0, of the stepped waveguide 1. The light may propagate along +x in a first direction, within the stepped waveguide 1, while at the same time, the light may fan out in the xy plane and upon reaching the far curved end side 4, may substantially or entirely fill the curved end side 4. While propagating, the light may spread out to a set of angles in the xz plane up to, but not exceeding the critical angle of the guide material. The extraction features 12 that link the guiding features 10 of the bottom side of the stepped waveguide 1 may have a tilt angle greater than the critical angle and hence may be missed by substantially all light propagating along +x in the first direction, ensuring the substantially lossless forward propagation.

Continuing the discussion of FIGS. 1A and 1B, the curved end side 4 of the stepped waveguide 1 may be made reflective, typically by being coated with a reflective material such as, for example, silver, although other reflective techniques may be employed. Light may therefore be redirected in a second direction, back down the guide in the direction of –x and may be substantially collimated in the xy or display plane. The angular spread may be substantially preserved in the xz plane about the principal propagation direction, which may allow light to hit the riser edges and reflect out of the guide. In an embodiment with approximately 45 degree tilted extraction features 12, light may be effectively directed approximately normal to the xy display plane with the xz angular spread substantially maintained relative to the propagation direction. This angular spread may be increased when light exits the stepped waveguide 1 through refraction, but may be decreased somewhat dependent on the reflective properties of the extraction features 12.

In some embodiments with uncoated extraction features 12, reflection may be reduced when total internal reflection (TIR) fails, squeezing the xz angular profile and shifting off normal. However, in other embodiments having silver coated or metallized extraction features, the increased angular spread and central normal direction may be preserved. Continuing the description of the embodiment with silver coated extraction features, in the xz plane, light may exit the stepped waveguide 1 approximately collimated and may be directed off normal in proportion to the y-position of the respective illuminator element 15a-15n in illuminator array 15 from the input edge center. Having independent illuminator elements 15a-15n along the input edge 2 then enables light to exit from the entire first light directing side 6 and propagate at different external angles, as illustrated in FIG. 1A.

In one embodiment, a display device may include a stepped waveguide or light valve which in turn, may include a first guide surface that may be arranged to guide light by total internal reflection. The light valve may include a second guide surface which may have a plurality of light extraction features inclined to reflect light guided through the waveguide in directions allowing exit through the first guide surface as the output light. The second guide surface may also have regions between the light extraction features that may be arranged to direct light through the waveguide without extracting it.

In another embodiment, a display device may include a waveguide with at least a first guide surface which may be arranged to guide light by total internal reflection and a second guide surface which may be substantially planar and inclined at an angle to reflect light in directions that break the total internal reflection for outputting light through the first guide surface. The display device may include a deflection element extending across the first guide surface of the waveguide for deflecting light towards the normal to the SLM 48.

In yet another embodiment, a display device may include a waveguide which may have a reflective end facing the input end for reflecting light from the input light back through the waveguide. The waveguide may further be arranged to output light through the first guide surface after reflection from the reflective end.

Figure 2A:
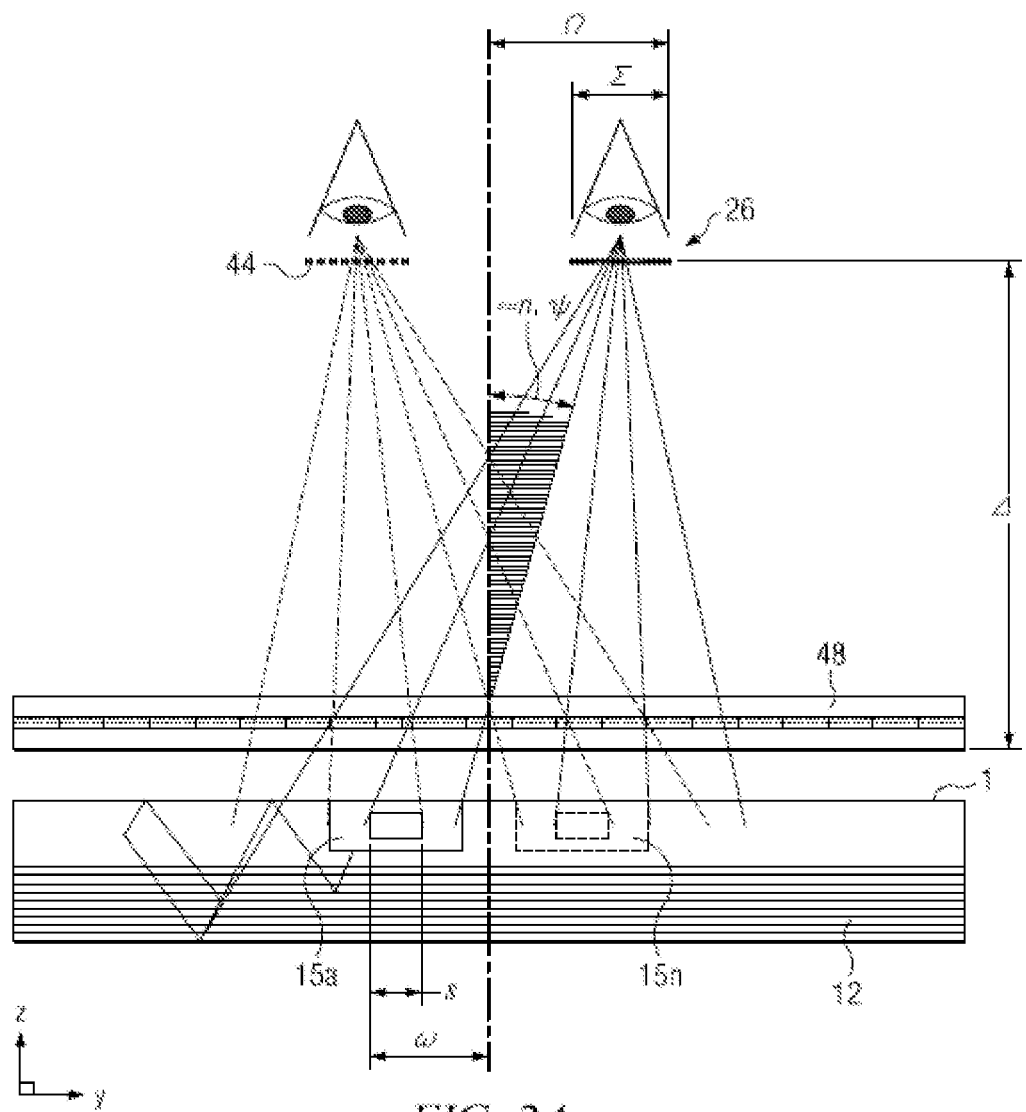
FIG. 2A is a schematic diagram illustrating in a top view of light propagation in another embodiment of a directional display device, in accordance with the present disclosure.
Figure 2B:
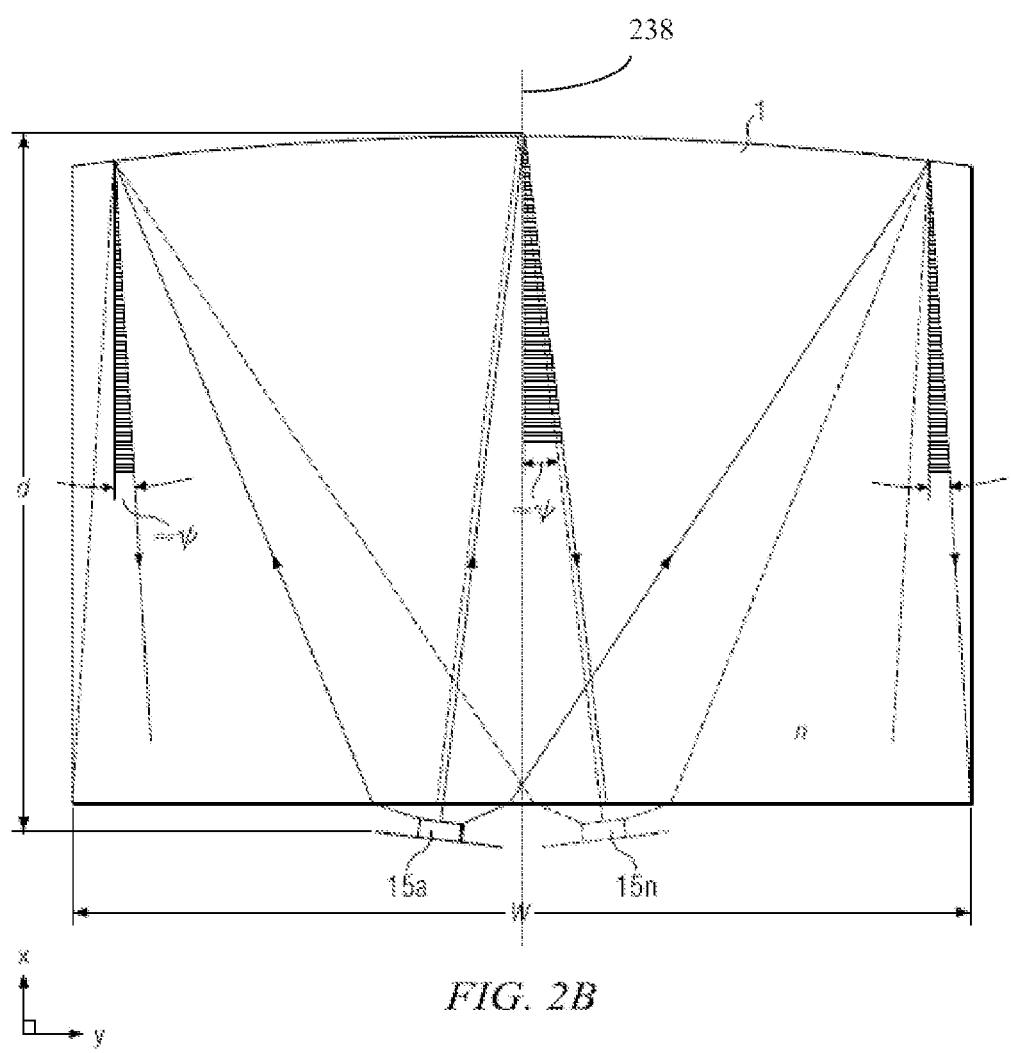
FIG. 2B is a schematic diagram illustrating light propagation in a front view of the directional display device of FIG. 2A, in accordance with the present disclosure.
Figure 2C:
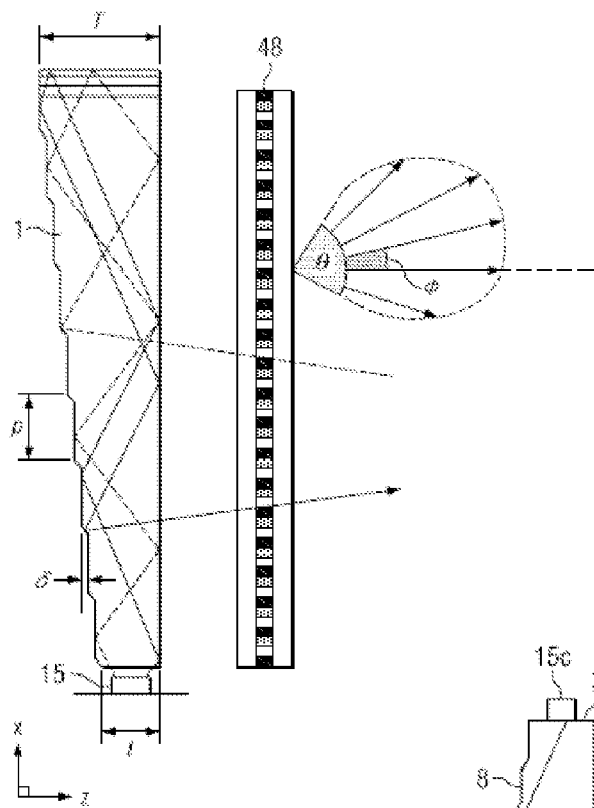
FIG. 2C is a schematic diagram illustrating light propagation in a side view of the directional display device of FIG. 2A, in accordance with the present disclosure.

Illuminating an SLM 48 such as a fast liquid crystal display (LCD) panel with such a device may achieve autostereoscopic 3D as shown in top view or yz-plane viewed from the illuminator array 15 end in FIG. 2A, front view in FIG. 2B and side view in FIG. 2C. FIG. 2A is a schematic diagram illustrating in a top view, propagation of light in a directional display device, FIG. 2B is a schematic diagram illustrating in a front view, propagation of light in a directional display device, and FIG. 2C is a schematic diagram illustrating in side view propagation of light in a directional display device. As illustrated in FIGS. 2A, 2B, and 2C, a stepped waveguide 1 may be located behind a fast (e.g., greater than 100 Hz) LCD panel SLM 48 that displays sequential right and left eye images. In synchronization, specific illuminator elements 15a through 15n of illuminator array 15 (where n is an integer greater than one) may be selectively turned on and off, providing illuminating light that enters right and left eyes substantially independently by virtue of the system's directionality. In the simplest case, sets of illuminator elements of illuminator array 15 are turned on together, providing a one dimensional viewing window 26 or an optical pupil with limited width in the horizontal direction, but extended in the vertical direction, in which both eyes horizontally separated may view a left eye image, and another viewing window 44 in which a right eye image may primarily be viewed by both eyes, and a central position in which both the eyes may view different images. In this way, 3D may be viewed when the head of a viewer is approximately centrally aligned. Movement to the side away from the central position may result in the scene collapsing onto a 2D image.

The reflective end 4 may have positive optical power in the lateral direction across the waveguide. In embodiments in which typically the reflective end 4 has positive optical power, the optical axis may be defined with reference to the shape of the reflective end 4, for example being a line that passes through the centre of curvature of the reflective end 4 and coincides with the axis of reflective symmetry of the end 4 about the x-axis. In the case that the reflecting surface 4 is flat, the optical axis may be similarly defined with respect to other components having optical power, for example the light extraction features 12 if they are curved, or the Fresnel lens 62 described below. The optical axis 238 is typically coincident with the mechanical axis of the waveguide 1. In the present embodiments that typically comprise a substantially cylindrical reflecting surface at end 4, the optical axis 238 is a line that passes through the centre of curvature of the surface at end 4 and coincides with the axis of reflective symmetry of the side 4 about the x-axis. The optical axis 238 is typically coincident with the mechanical axis of the waveguide 1. The cylindrical reflecting surface at end 4 may typically comprise a spherical profile to optimize performance for on-axis and off-axis viewing positions. Other profiles may be used.

Figure 3:
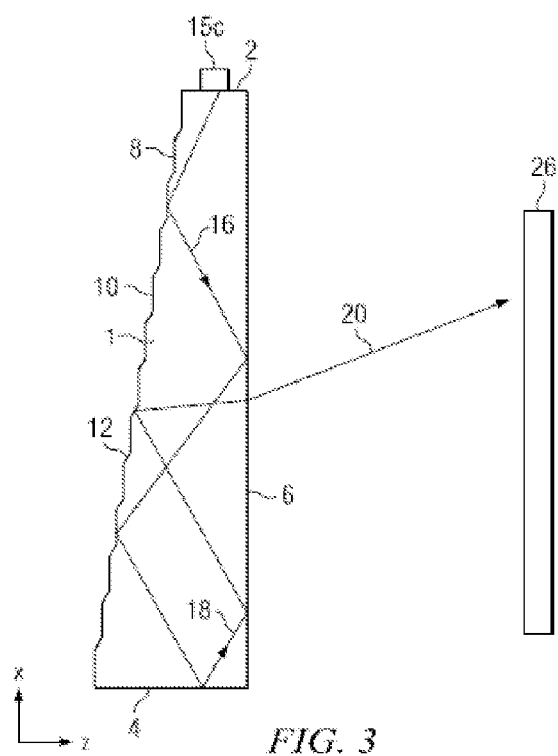
FIG. 3 is a schematic diagram illustrating in a side view of a directional display device, in accordance with the present disclosure.

FIG. 3 is a schematic diagram illustrating in side view a directional display device. Further, FIG. 3 illustrates additional detail of a side view of the operation of a stepped waveguide 1, which may be a transparent material. The stepped waveguide 1 may include an illuminator input end 2, a reflective end 4, a first light directing side 6 which may be substantially planar, and a second light directing side 8 which includes guiding features 10 and light extraction features 12. In operation, light rays 16 from an illuminator element 15c of an illuminator array 15 (not shown in FIG. 3), that may be an addressable array of LEDs for example, may be guided in the stepped waveguide 1 by means of total internal reflection by the first light directing side 6 and total internal reflection by the guiding feature 10, to the reflective end 4, which may be a mirrored surface. Although reflective end 4 may be a mirrored surface and may reflect light, it may in some embodiments also be possible for light to pass through reflective end 4.

Continuing the discussion of FIG. 3, light ray 18 reflected by the reflective end 4 may be further guided in the stepped waveguide 1 by total internal reflection at the reflective end 4 and may be reflected by extraction features 12. Light rays 18 that are incident on extraction features 12 may be substantially deflected away from guiding modes of the stepped waveguide 1 and may be directed, as shown by ray 20, through the side 6 to an optical pupil that may form a viewing window 26 of an autostereoscopic display. The width of the viewing window 26 may be determined by at least the size of the illuminator, output design distance and optical power in the side 4 and extraction features 12. The height of the viewing window may be primarily determined by the reflection cone angle of the extraction features 12 and the illumination cone angle input at the input end 2. Thus each viewing window 26 represents a range of separate output directions with respect to the surface normal direction of the SLM 48 that intersect with a plane at the nominal viewing distance.

Figure 4A:
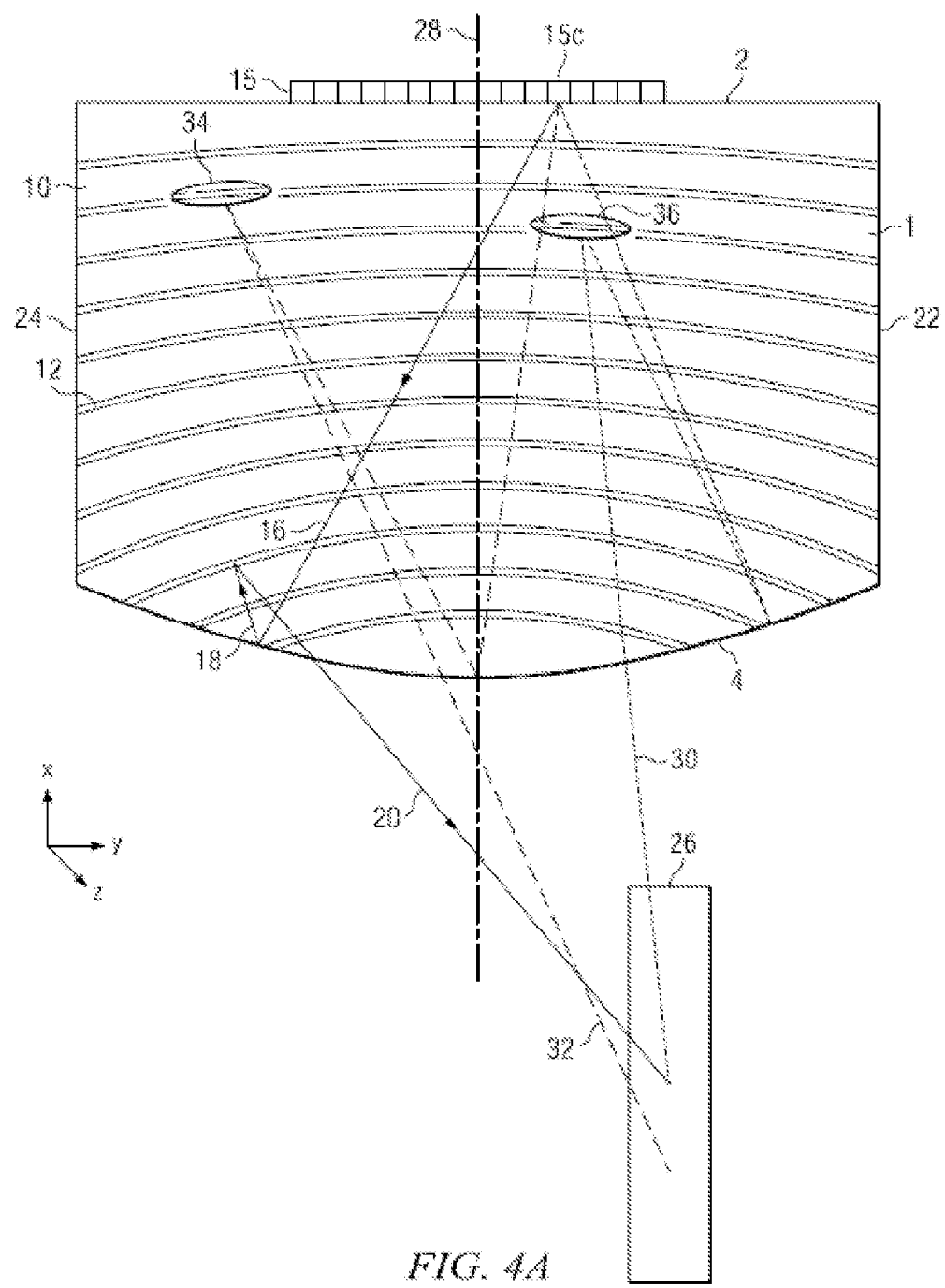
FIG. 4A is schematic diagram illustrating in a front view, generation of a viewing window in a directional display device and including curved light extraction features, in accordance with the present disclosure.

FIG. 4A is a schematic diagram illustrating in front view a directional display device which may be illuminated by a first illuminator element and including curved light extraction features. In FIG. 4A, the directional backlight may include the stepped waveguide 1 and the light source illuminator array 15. Further, FIG. 4A shows in front view further guiding of light rays from illuminator element 15c of illuminator array 15, in the stepped waveguide 1. Each of the output rays are directed towards the same viewing window 26 from the respective illuminator 14. Thus light ray 30 may intersect the ray 20 in the window 26, or may have a different height in the window as shown by ray 32. Additionally, in various embodiments, sides 22, 24 of the waveguide may be transparent, mirrored, or blackened surfaces. Continuing the discussion of FIG. 4A, light extraction features 12 may be elongate, and the orientation of light extraction features 12 in a first region 34 of the light directing side 8 (light directing side 8 shown in FIG. 3, but not shown in FIG. 4A) may be different to the orientation of light extraction features 12 in a second region 36 of the light directing side 8.

Figure 4B:
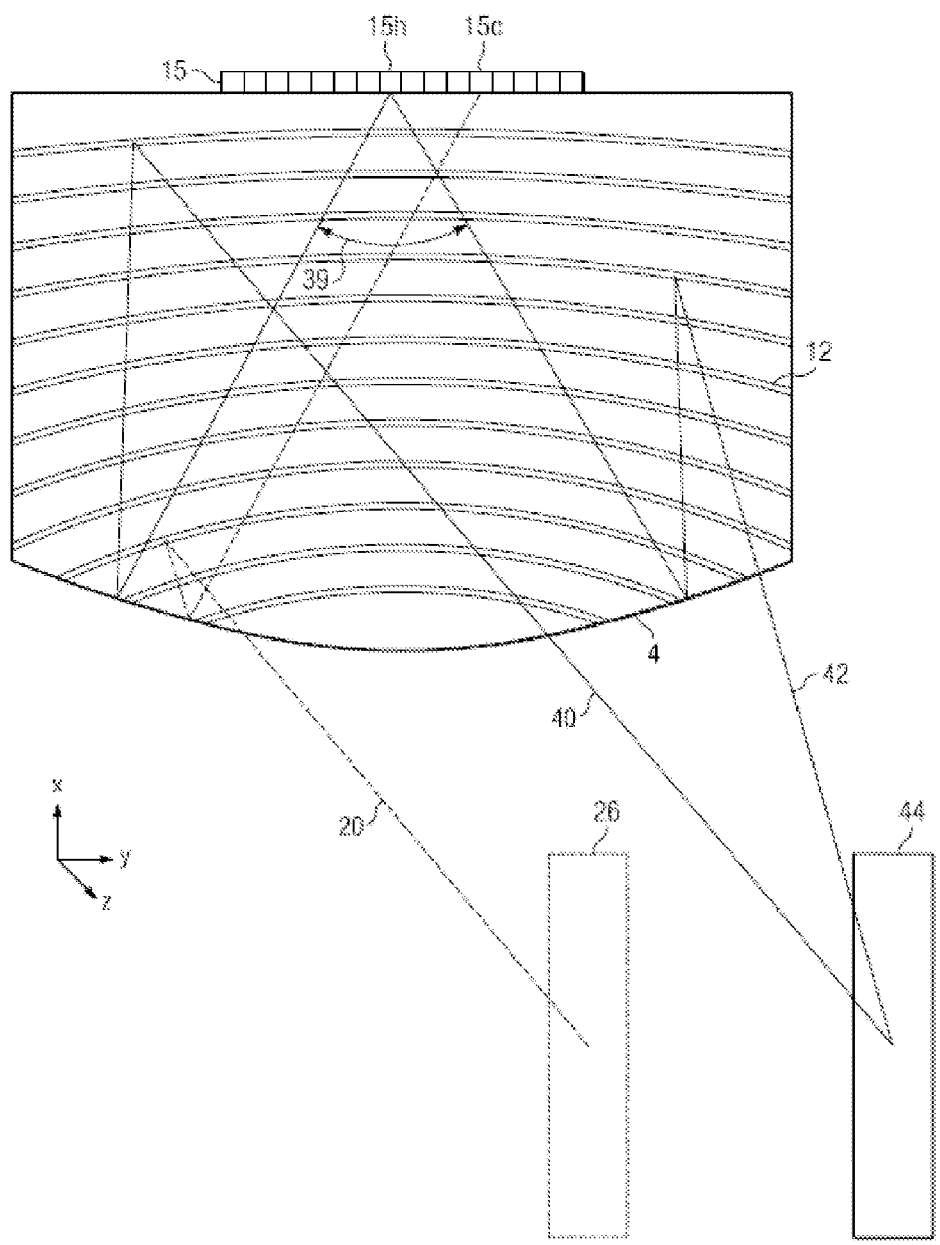
FIG. 4B is a schematic diagram illustrating in a front view, generation of a first and a second viewing window in a directional display device and including curved light extraction features, in accordance with the present disclosure.

FIG. 4B is a schematic diagram illustrating in front view a directional display device which may illuminated by a second illuminator element. Further, FIG. 4B shows the light rays 40, 42 from a second illuminator element 15h of the illuminator array 15. The curvature of the reflective surface on the side 4 and the light extraction features 12 cooperatively produce a second viewing window 44 laterally separated from the viewing window 26 with light rays from the illuminator element 15h.

Advantageously, the arrangement illustrated in FIG. 4B may provide a real image of the illuminator element 15c at a viewing window 26 in which the real image may be formed by cooperation of optical power in reflective end 4 and optical power which may arise from different orientations of elongate light extraction features 12 between regions 34 and 36, as shown in FIG. 4A. The arrangement of FIG. 4B may achieve improved aberrations of the imaging of illuminator element 15c to lateral positions in viewing window 26. Improved aberrations may achieve an extended viewing freedom for an autostereoscopic display while achieving low cross talk levels.

Figure 5:
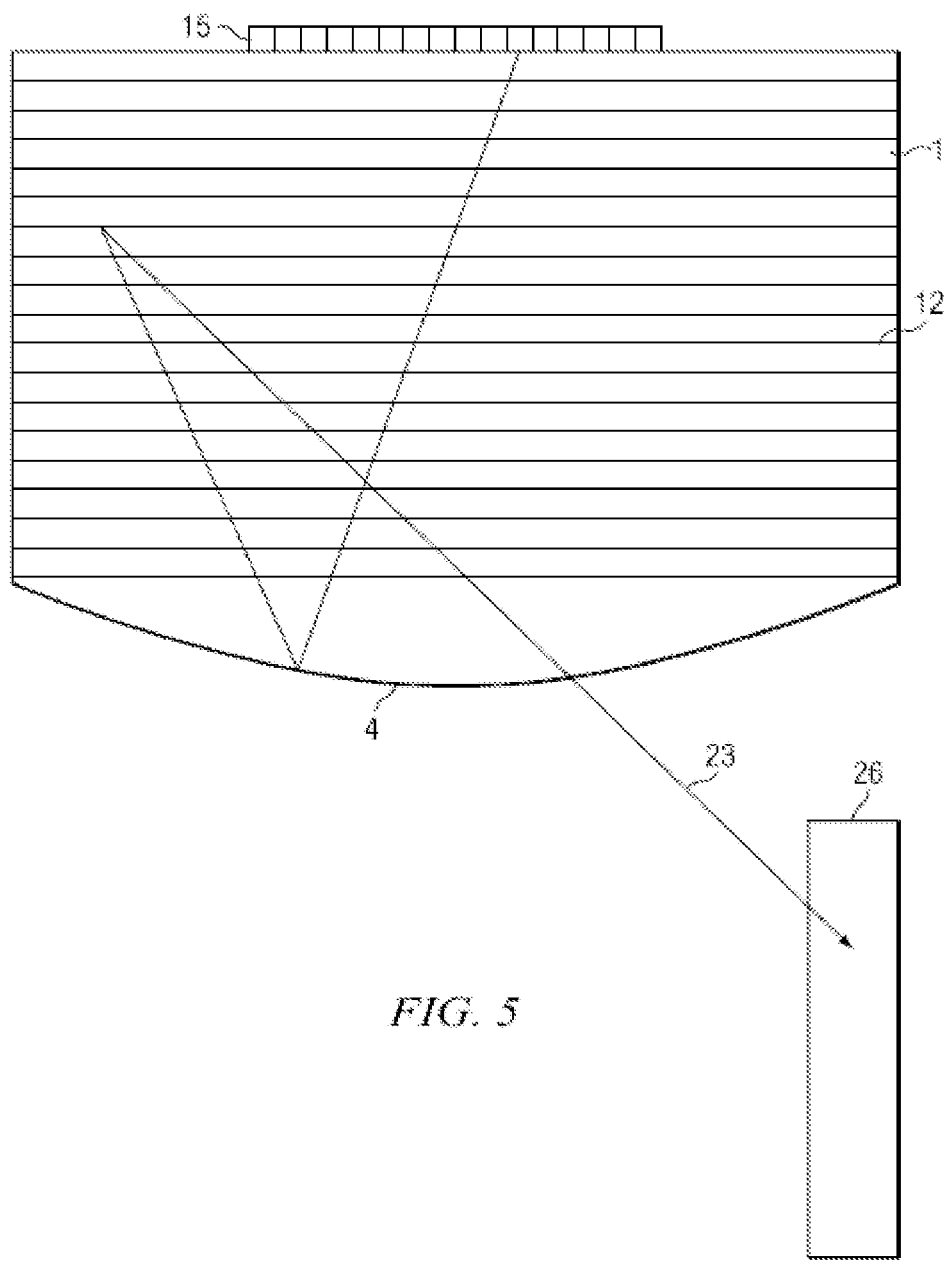
FIG. 5 is a schematic diagram illustrating generation of a first viewing window in a directional display device including linear light extraction features, in accordance with the present disclosure.

FIG. 5 is a schematic diagram illustrating in front view an embodiment of a directional display device comprising a waveguide 1 having substantially linear light extraction features. Further, FIG. 5 shows a similar arrangement of components to FIG. 1 (with corresponding elements being similar), with one of the differences being that the light extraction features 12 are substantially linear and parallel to each other. Advantageously, such an arrangement may provide substantially uniform illumination across a display surface and may be more convenient to manufacture than the curved extraction features of FIG. 4A and FIG. 4B.

Figure 6A:
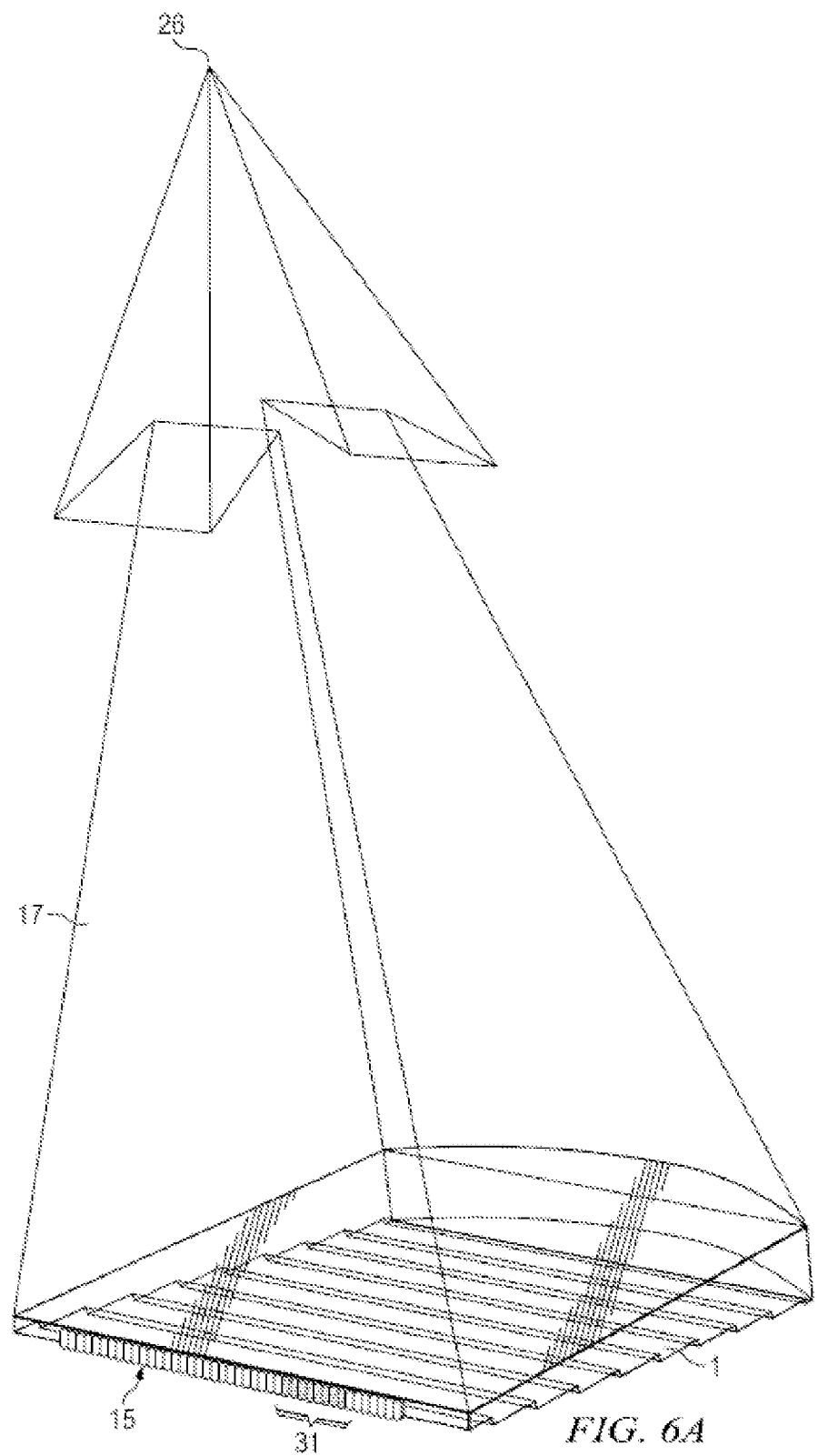
FIG. 6A is a schematic diagram illustrating one embodiment of the generation of a first viewing window in a time multiplexed imaging directional display device in a first time slot, in accordance with the present disclosure.
Figure 6B:
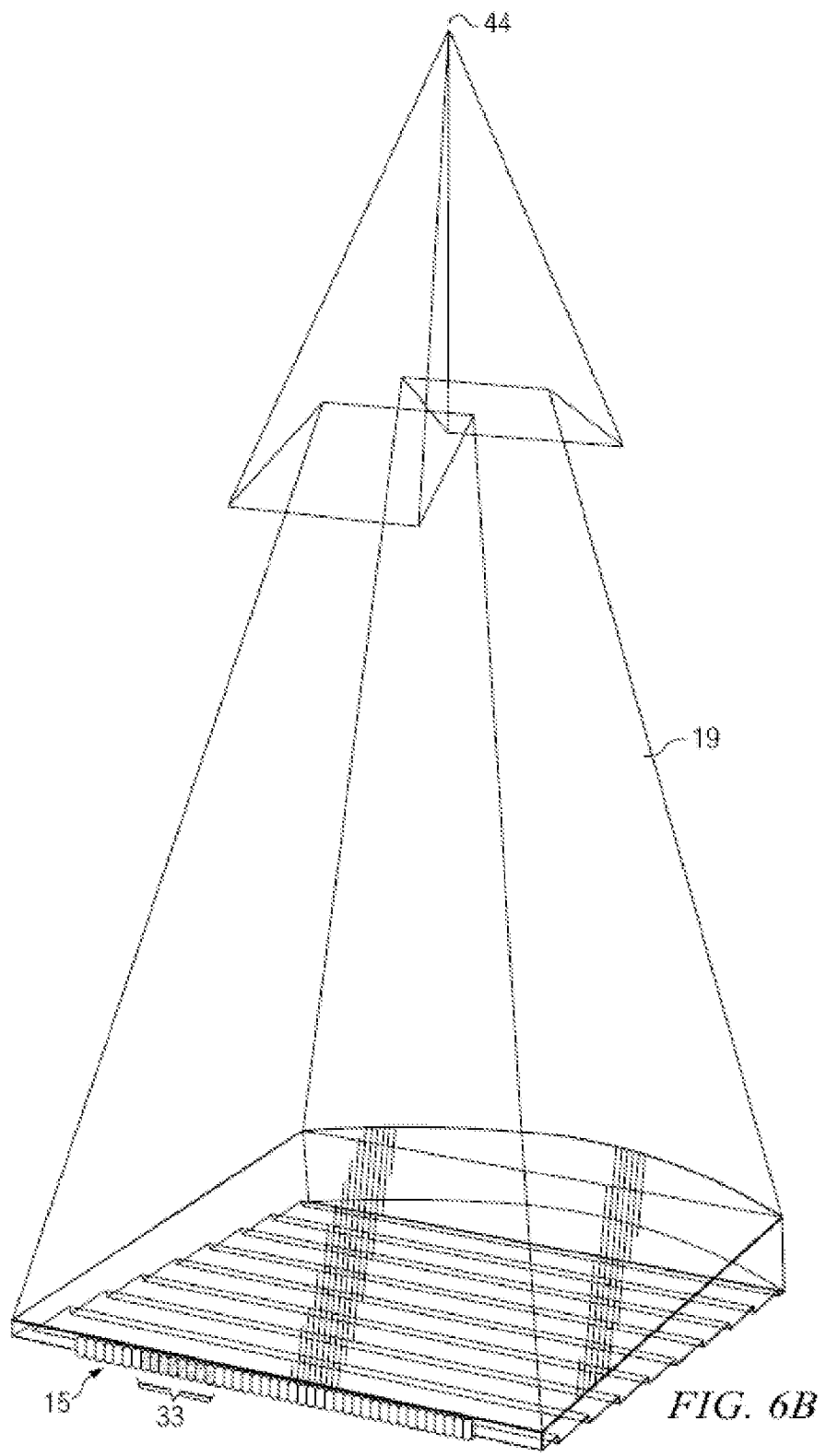
FIG. 6B is a schematic diagram illustrating another embodiment of the generation of a second viewing window in a time multiplexed directional display device in a second time slot, in accordance with the present disclosure.
Figure 6C:
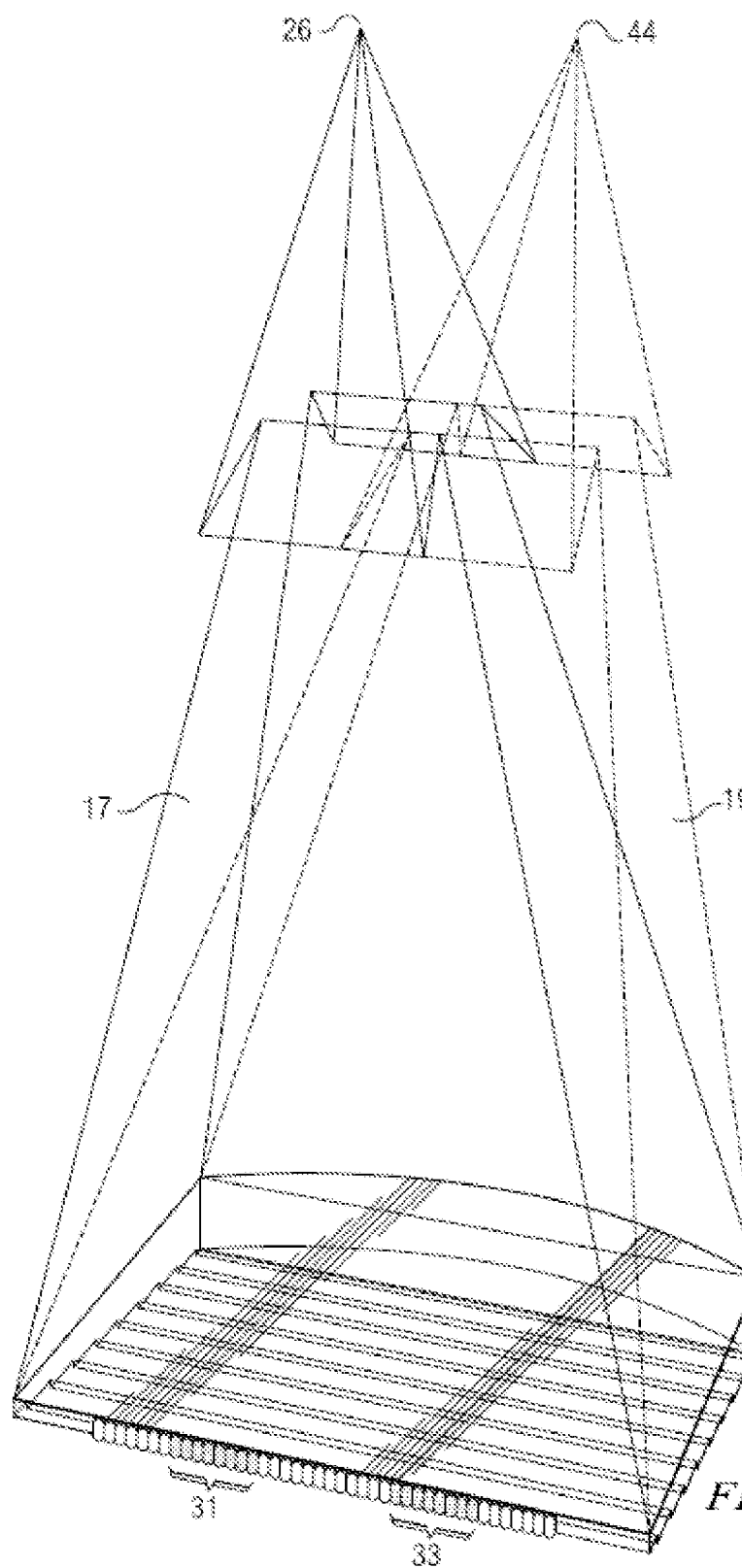
FIG. 6C is a schematic diagram illustrating another embodiment of the generation of a first and a second viewing window in a time multiplexed directional display device, in accordance with the present disclosure.

FIG. 6A is a schematic diagram illustrating one embodiment of the generation of a first viewing window in a time multiplexed imaging directional display device, namely an optical valve apparatus in a first time slot. FIG. 6B is a schematic diagram illustrating another embodiment of the generation of a second viewing window in a time multiplexed imaging directional backlight apparatus in a second time slot. FIG. 6C is a schematic diagram illustrating another embodiment of the generation of a first and a second viewing window in a time multiplexed imaging directional display device. Further, FIG. 6A shows schematically the generation of viewing window 26 from stepped waveguide 1. Illuminator element group 31 in illuminator array 15 may provide a light cone 17 directed towards a viewing window 26. FIG. 6B shows schematically the generation of illumination window 44. Illuminator element group 33 in illuminator array 15 may provide a light cone 19 directed towards viewing window 44. In cooperation with a time multiplexed display, windows 26 and 44 may be provided in sequence as shown in FIG. 6C. If the image on a SLM 48 (not shown in FIGS. 6A, 6B, 6C) is adjusted in correspondence with the light direction output, then an autostereoscopic image may be achieved for a suitably placed viewer. Similar operation can be achieved with all the directional backlights and directional display devices described herein. Note that illuminator element groups 31, 33 each include one or more illumination elements from illumination elements 15a to 15n, where n is an integer greater than one.

Figure 7:
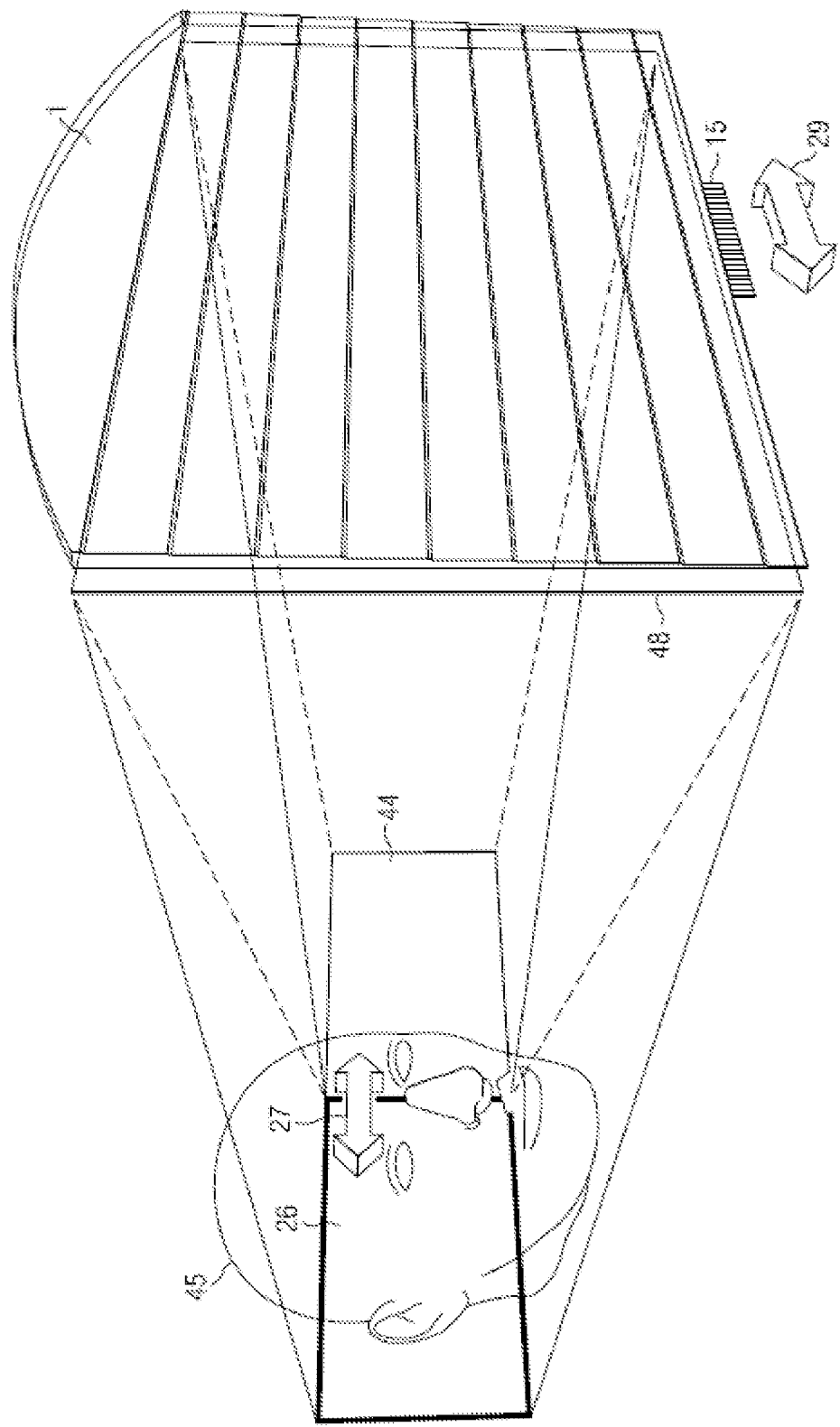
FIG. 7 is a schematic diagram illustrating an observer tracking autostereoscopic display apparatus including a time multiplexed directional display device, in accordance with the present disclosure.

FIG. 7 is a schematic diagram illustrating one embodiment of an observer tracking autostereoscopic directional display device including a time multiplexed directional backlight. As shown in FIG. 7, selectively turning on and off illuminator elements 15a to 15n along axis 29 provides for directional control of viewing windows. The head 45 position may be monitored with a camera, motion sensor, motion detector, or any other appropriate optical, mechanical or electrical means, and the appropriate illuminator elements of illuminator array 15 may be turned on and off to provide substantially independent images to each eye irrespective of the head 45 position. The head tracking system (or a second head tracking system) may provide monitoring of more than one head 45, 47 (head 47 not shown in FIG. 7) and may supply the same left and right eye images to each viewers' left and right eyes providing 3D to all viewers. Again similar operation can be achieved with all the directional backlights and directional display devices described herein.

Figure 8:
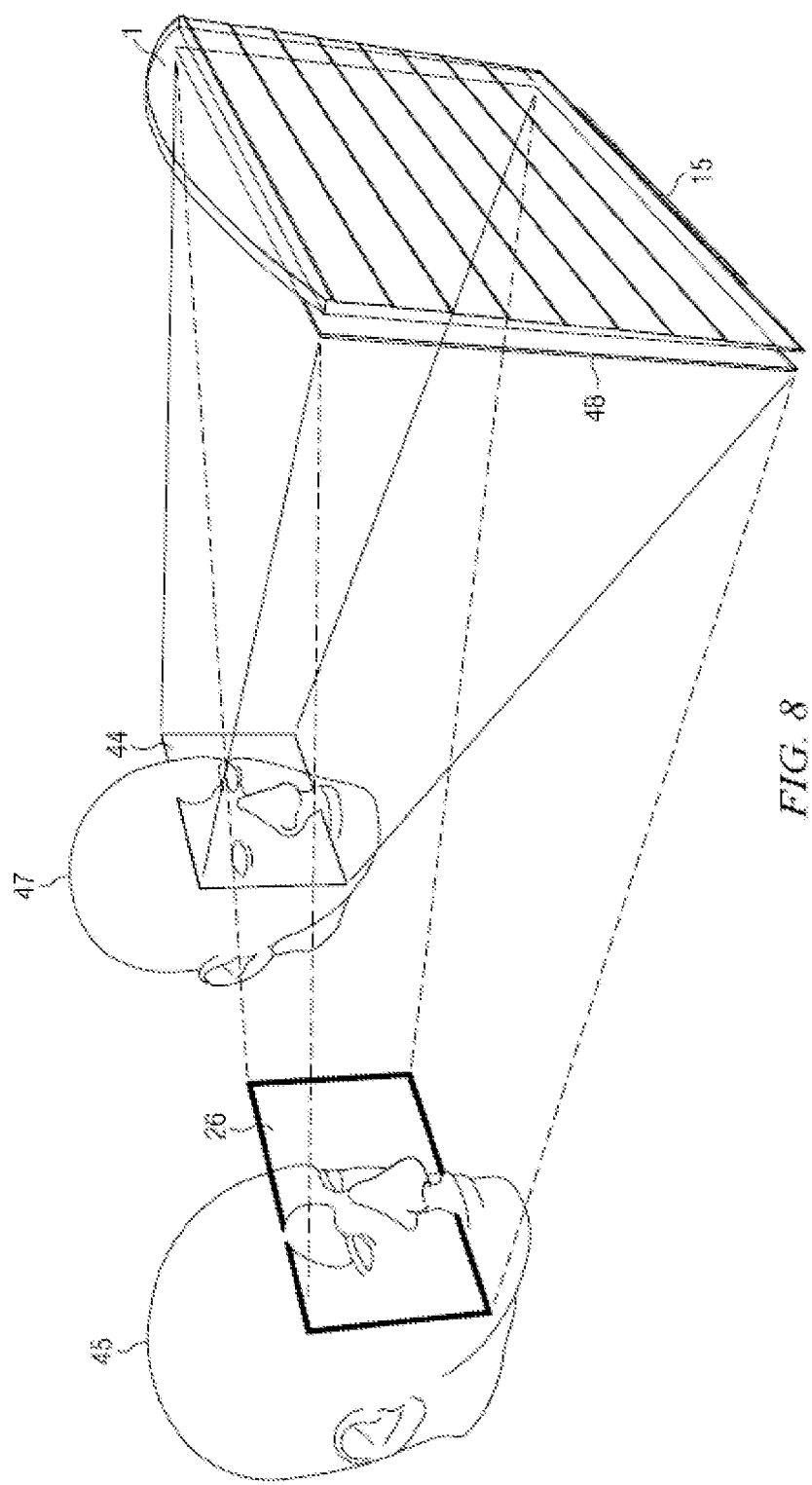
FIG. 8 is a schematic diagram illustrating a multi-viewer directional display device.

FIG. 8 is a schematic diagram illustrating one embodiment of a multi-viewer directional display device as an example including an imaging directional backlight. As shown in FIG. 8, at least two 2D images may be directed towards a pair of viewers 45, 47 so that each viewer may watch a different image on the SLM 48. The two 2D images of FIG. 8 may be generated in a similar manner as described with respect to FIG. 7 in that the two images would be displayed in sequence and in synchronization with sources whose light is directed toward the two viewers. One image is presented on the SLM 48 in a first phase, and a second image is presented on the SLM 48 in a second phase different from the first phase. In correspondence with the first and second phases, the output illumination is adjusted to provide first and second viewing windows 26, 44 respectively. An observer with both eyes in window 26 will perceive a first image while an observer with both eyes in window 44 will perceive a second image.

Figure 9:
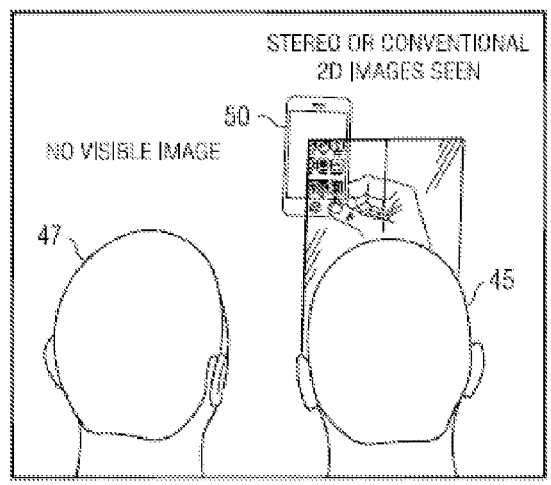
FIG. 9 is a schematic diagram illustrating a privacy directional display device, in accordance with the present disclosure.

FIG. 9 is a schematic diagram illustrating a privacy directional display device which includes an imaging directional backlight. 2D image display systems may also utilize directional backlighting for security and efficiency purposes in which light may be primarily directed at the eyes of a first viewer 45 as shown in FIG. 9. Further, as illustrated in FIG. 9, although first viewer 45 may be able to view an image on device 50, light is not directed towards second viewer 47. Thus second viewer 47 is prevented from viewing an image on device 50. Each of the embodiments of the present disclosure may advantageously provide autostereoscopic, dual image or privacy display functions.

Figure 10:
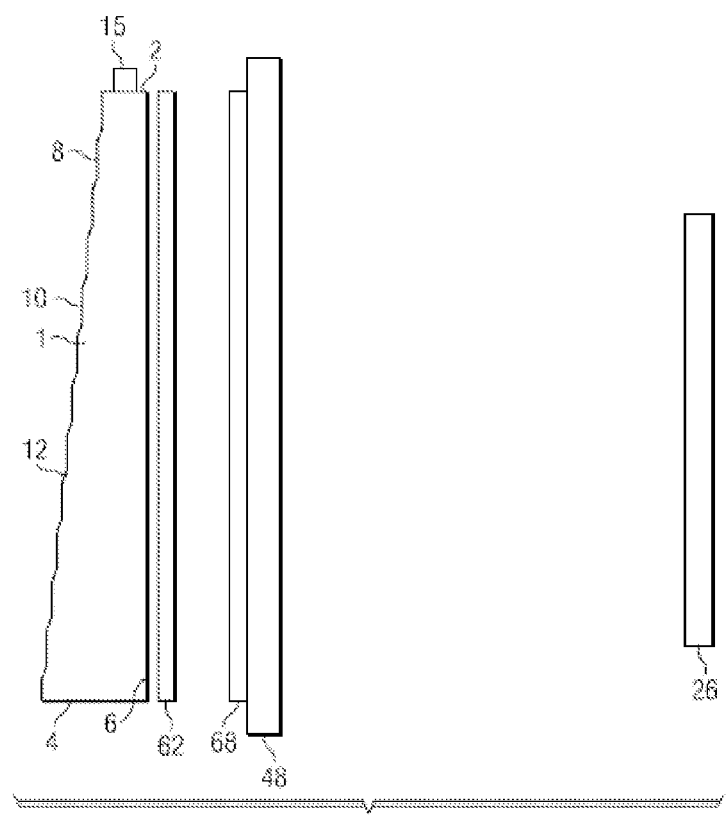
FIG. 10 is a schematic diagram illustrating in side view, the structure of a time multiplexed directional display device, in accordance with the present disclosure.

FIG. 10 is a schematic diagram illustrating in side view the structure of a time multiplexed directional display device as an example including an imaging directional backlight. Further, FIG. 10 shows in side view an autostereoscopic directional display device, which may include the stepped waveguide 1 and a Fresnel lens 62 arranged to provide the viewing window 26 for a substantially collimated output across the stepped waveguide 1 output surface. A vertical diffuser 68 may be arranged to extend the height of the viewing window 26 further. The light may then be imaged through the SLM 48. The illuminator array 15 may include light emitting diodes (LEDs) that may, for example, be phosphor converted blue LEDs, or may be separate RGB LEDs. Alternatively, the illuminator elements in illuminator array 15 may include a uniform light source and SLM 48 arranged to provide separate illumination regions. Alternatively the illuminator elements may include laser light source(s). The laser output may be directed onto a diffuser by means of scanning, for example, using a galvo or MEMS scanner. In one example, laser light may thus be used to provide the appropriate illuminator elements in illuminator array 15 to provide a substantially uniform light source with the appropriate output angle, and further to provide reduction in speckle. Alternatively, the illuminator array 15 may be an array of laser light emitting elements. Additionally in one example, the diffuser may be a wavelength converting phosphor, so that illumination may be at a different wavelength to the visible output light.

Figure 11A:
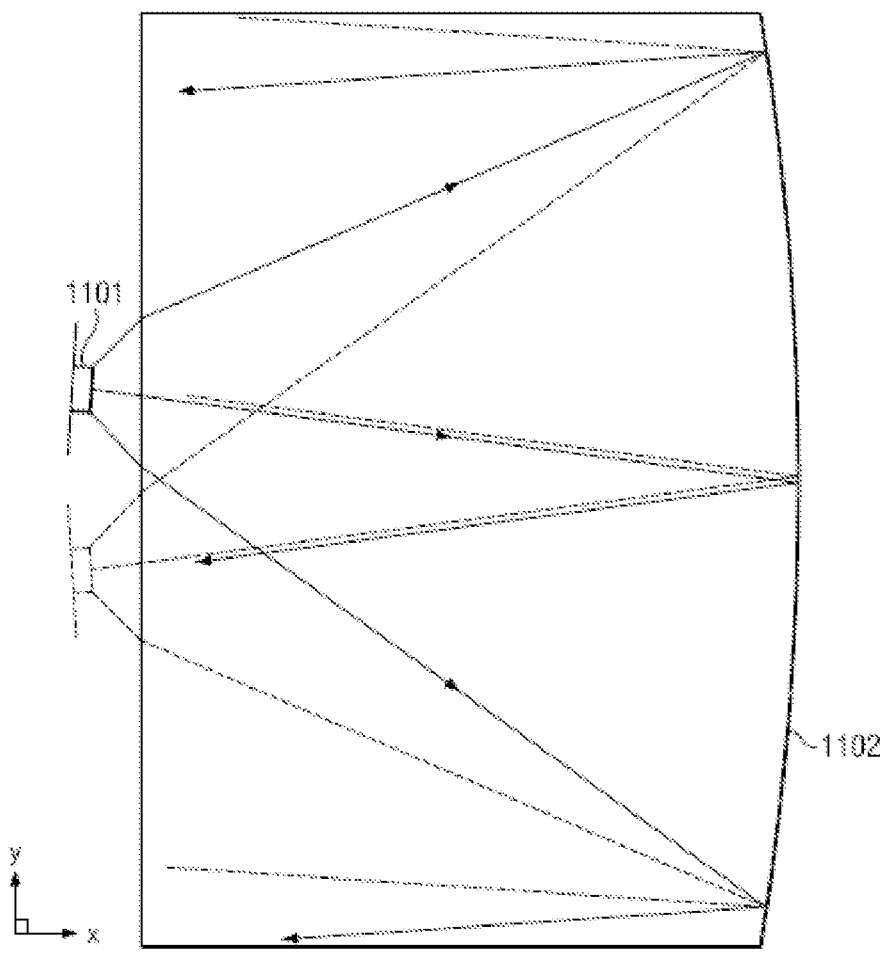
FIG. 11A is a schematic diagram illustrating a front view of a wedge type directional backlight, in accordance with the present disclosure.
Figure 11B:
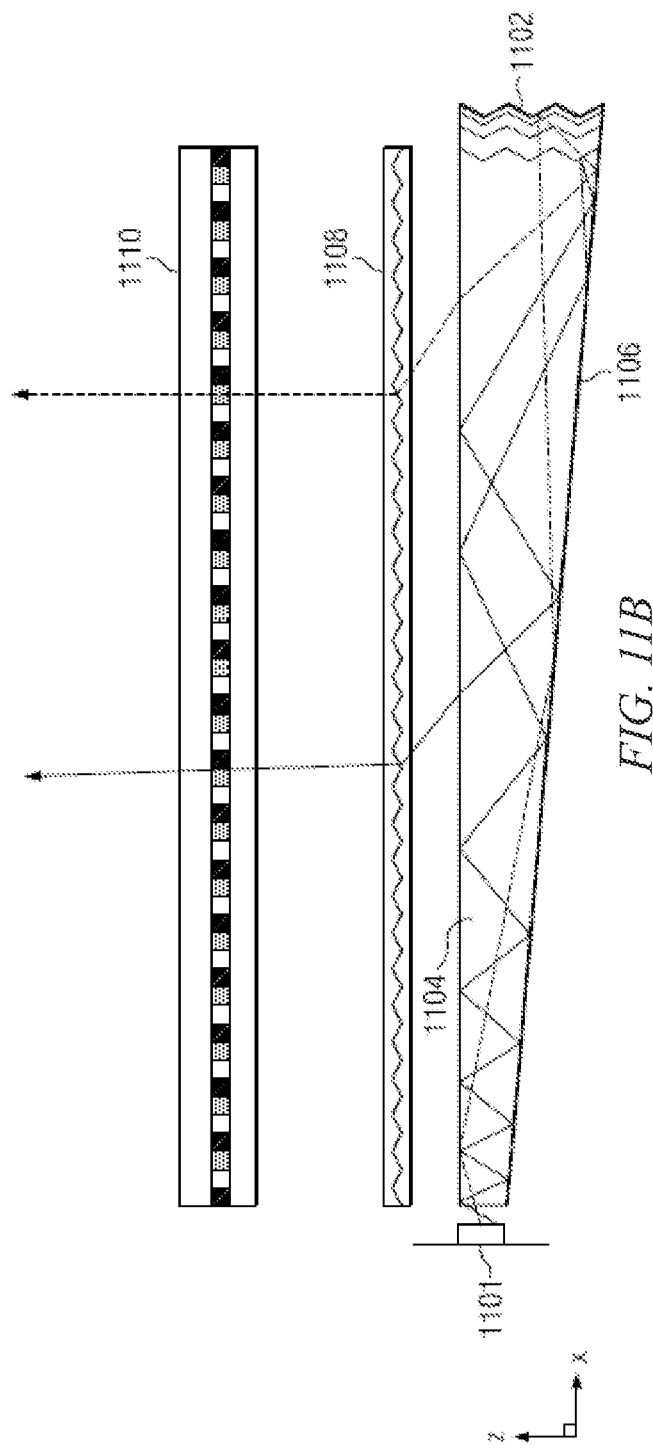
FIG. 11B is a schematic diagram illustrating a side view of a wedge type directional backlight, in accordance with the present disclosure.

FIG. 11A is a schematic diagram illustrating a front view of another imaging directional display device, as illustrated, a wedge type directional backlight, and FIG. 11B is a schematic diagram illustrating a side view of the same wedge type directional display device. A wedge type directional backlight is generally discussed by U.S. Pat. No. 7,660,047 and entitled "Flat Panel Lens," which is herein incorporated by reference in its entirety. The structure may include a wedge type waveguide 1104 with a bottom surface which may be preferentially coated with a reflecting layer 1106 and with an end corrugated surface 1102, which may also be preferentially coated with a reflecting layer 1106. As shown in FIG. 11B, light may enter the wedge type waveguide 1104 from local sources 1101 and the light may propagate in a first direction before reflecting off the end surface. Light may exit the wedge type waveguide 1104 while on its return path and may illuminate a display panel 1110. By way of comparison with an optical valve, a wedge type waveguide provides extraction by a taper that reduces the incidence angle of propagating light so that when the light is incident at the critical angle on an output surface, it may escape. Escaping light at the critical angle in the wedge type waveguide propagates substantially parallel to the surface until deflected by a redirection layer 1108 such as a prism array. Errors or dust on the wedge type waveguide output surface may change the critical angle, creating stray light and uniformity errors. Further, an imaging directional backlight that uses a mirror to fold the beam path in the wedge type directional backlight may employ a faceted mirror that biases the light cone directions in the wedge type waveguide. Such faceted mirrors are generally complex to fabricate and may result in illumination uniformity errors as well as stray light.

The wedge type directional backlight and optical valve further process light beams in different ways. In the wedge type waveguide, light input at an appropriate angle will output at a defined position on a major surface, but light rays will exit at substantially the same angle and substantially parallel to the major surface. By comparison, light input to a stepped waveguide of an optical valve at a certain angle may output from points across the first side, with output angle determined by input angle. Advantageously, the stepped waveguide of the optical valve may not require further light re-direction films to extract light towards an observer and angular non-uniformities of input may not provide non-uniformities across the display surface.

There follows a description of some directional display apparatuses including a directional display device and a control system, wherein the directional display device includes a directional backlight including a waveguide and an SLM. In the following description, the waveguides, directional backlights and directional display devices are based on and incorporate the structures of FIGS. 1 to 11B above. Except for the modifications and/or additional features which will now be described, the above description applies equally to the following waveguides, directional backlights and display devices, but for brevity will not be repeated.

Figure 12:
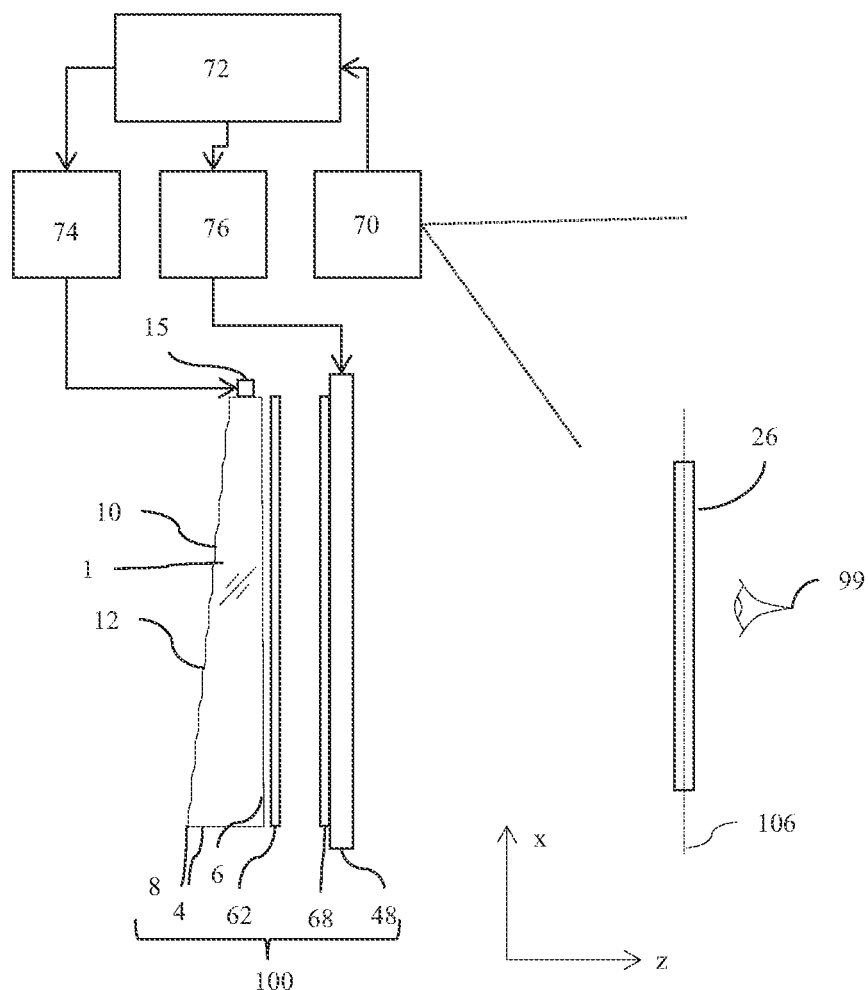
FIG. 12 is a schematic diagram illustrating a directional display apparatus comprising a display device and a control system, in accordance with the present disclosure.

FIG. 12 is a schematic diagram illustrating a directional display apparatus comprising a display device 100 and a control system. The arrangement and operation of the control system will now be described and may be applied, mutatis mutandis, to each of the display devices disclosed herein. As illustrated in FIG. 12, a directional display device 100 may include a directional backlight device that may itself include a stepped waveguide 1 and a light source illuminator array 15. As illustrated in FIG. 12, the stepped waveguide 1 includes a light directing side 8, a reflective end 4, guiding features 10 and light extraction features 12. The directional display device 100 may further include an SLM 48.

The waveguide 1 is arranged as described above. The reflective end 4 converges the reflected light. A Fresnel lens 62 may be arranged to cooperate with reflective end 4 to achieve viewing windows 26 at a viewing plane 106 observed by an observer 99. A transmissive SLM 48 may be arranged to receive the light from the directional backlight. Further a diffuser 68 may be provided to substantially remove Moiré beating between the waveguide 1 and pixels of the SLM 48 as well as the Fresnel lens structure 62.

The control system may comprise a sensor system arranged to detect the position of the observer 99 relative to the display device 100. The sensor system comprises a position sensor 70, such as a camera, and a head position measurement system 72 that may for example comprise a computer vision image processing system. The control system may further comprise an illumination controller 74 and an image controller 76 that are both supplied with the detected position of the observer supplied from the head position measurement system 72.

The illumination controller 74 selectively operates the illuminator elements 15 to direct light to into the viewing windows 26 in cooperation with waveguide 1. The illumination controller 74 selects the illuminator elements 15 to be operated in dependence on the position of the observer detected by the head position measurement system 72, so that the viewing windows 26 into which light is directed are in positions corresponding to the left and right eyes of the observer 99. In this manner, the lateral output directionality of the waveguide 1 corresponds with the observer position.

The image controller 76 controls the SLM 48 to display images. To provide an autostereoscopic display, the image controller 76 and the illumination controller 74 may operate as follows. The image controller 76 controls the SLM 48 to display temporally multiplexed left and right eye images. The illumination controller 74 operate the light sources 15 to direct light into respective viewing windows in positions corresponding to the left and right eyes of an observer synchronously with the display of left and right eye images. In this manner, an autostereoscopic effect is achieved using a time division multiplexing technique.

Figure 13:
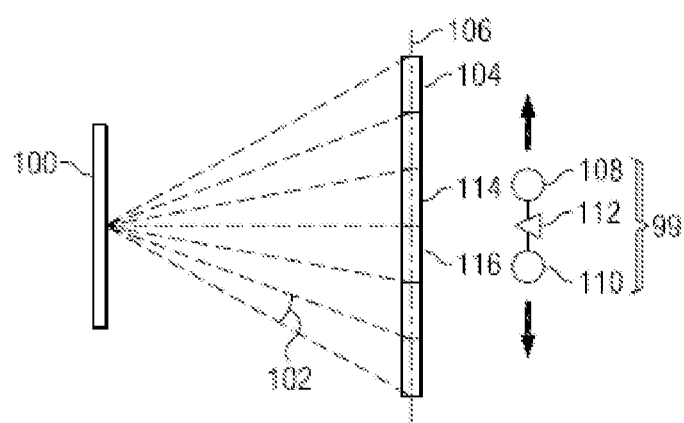
FIG. 13 is a schematic diagram illustrating in top view, the formation of viewing windows, in accordance with the present disclosure.

FIG. 13 is a schematic diagram illustrating in front view, the formation of viewing windows. Further, FIG. 13 shows in top view, the embodiment of FIG. 12. Display 100 may produce a fan of light cones 102 and an array of viewing windows 104 in the window plane 106, being a nominal plane. An observer 99 with nose location 112 may see illumination from display 100. When a left eye 110 is approximately aligned with window 116 and a right eye 108 is approximately aligned with window 114 and image data presented in windows 114 and 116 is a stereo pair, then an autostereoscopic 3D image may be perceived by the observer. The windows 114 and 116 may alternatively show substantially the same data so the display device 100 may function in as a 2D image display device. The windows 114 and 116 may be illuminated in separate time slots in synchronization with the display on the panel of left and right eye image data.

There will now be described various arrangements of viewing windows. Each of these may be provided by appropriate operation of the control system as described above, for example by selectively operating the illuminator elements 15 to direct light to into the viewing windows 26 in synchronization with the display of images on the SLM 48. The directional display apparatus may be operable to provide any one of these viewing window arrangements, or any combination of these viewing window arrangements at the same or different times, for example in different modes of operation of the directional display apparatus.

In the various drawings illustrating arrangements of viewing windows, the structure of optical windows illustrates the nominal position of the optical windows rather than the actual light distributions which may take a variety of forms and may overlap.

FIGS. 14A and 14B illustrate the control performed by the control system on the basis of the output of the sensor system in response to the observer moving. FIG. 14A is a schematic diagram illustrating in front view, a first viewing window arrangement. Further, FIG. 14A shows in front view, the embodiment of FIG. 12. The observer 99 is illustrated as slightly to the right of a plane 118 normal to the approximate center of the display 100. Accordingly left and right eye viewing windows 114, 116 may be generated slightly to the right of the display. In FIG. 14B the observer 99 is illustrated as being repositioned in direction 120 to the right and so windows 114, 116 may be steered to the right in response. FIG. 14B is a schematic diagram illustrating in front view, a second viewing window arrangement for a moving observer. Advantageously the left and right eyes of the observer may be illuminated with left and right eye image data during observer movement.

Window movement may be provided by mechanical movement of the illuminator array 15 in correspondence with observer 99 movement in the window plane 106. However, such movement is complicated and expensive. It is thus desirable to achieve a reduction in the cost and complexity of movement of illuminator elements of illuminator array 15 through switching of discrete illuminator elements, under the control of the control system.

FIG. 15 is a schematic diagram illustrating the appearance of windows of FIG. 14A in the window plane 106. Further, FIG. 15 shows schematically an array 121 of optical windows (that may also be referred to as sub-windows) which may be arranged to achieve a switchable array of viewing windows. Each optical window of the array 121 may correspond to the image in the window plane 106 such as shown in FIGS. 12 and 13 of a illuminator element of the illuminator array 15, as described above.

The illuminated structure of an optical window array 121 in the window plane 106 may approximately correspond to the lateral location of observer 99 as shown in FIG. 14A. In the present embodiment viewing window 116 for the left eye may include optical window 122 and the optical window array 134. The right eye viewing window 114 may include optical window 124 and optical window array 136. Optical windows 126 and 128 may not be illuminated, so that the respective illuminator elements may not be illuminated.

FIG. 16 is a schematic diagram illustrating the appearance of windows of FIG. 14B in the window plane for a moving observer. Further, FIG. 16 shows the detail of the optical window array 121 approximately corresponding to the location of observer 99 as shown in FIG. 14B after movement in direction 120. The left eye viewing window 116 may be arranged to include optical window 126 and optical window array 134. Thus, optical window 122 may be turned off. Similarly for the right eye viewing window, optical window 128 may be turned on and optical window 124 may be turned off, so that the right eye viewing window 114 is arranged to include optical window 128 and optical window array 136.

Advantageously such an embodiment may turn off optical windows away from the eyes of the observer so that as the observer 99 moves the appearance of a display device 100 with greatly enhanced viewing freedom may be achieved. Optical windows, such as optical window 124 which may approximately correspond to locations between the eyes for example, may be turned off to improve the crosstalk of the display images. Low crosstalk advantageously may increase the perceived quality of 3D stereoscopic images.

Further the observer location in two or three dimensions and motion characteristics, such as velocity, acceleration, direction, and head orientation may be determined from the sensor 70 and control unit 72. This in turn may be used to generate the likely observer eye locations in a future illumination time slot. Thus the appropriate illuminated structure of the array 121 of optical windows may be determined to optimize the output directionality of light from the display 100 in a given illumination time slot, and may be determined by setting the illumination structure of the respective illuminator elements of illuminator array 15 for the time slot. Further, the image data on the SLM 48 may be adjusted to advantageously achieve a look-around function, a two dimensional image or other image characteristics as described herein.

Figure 17:
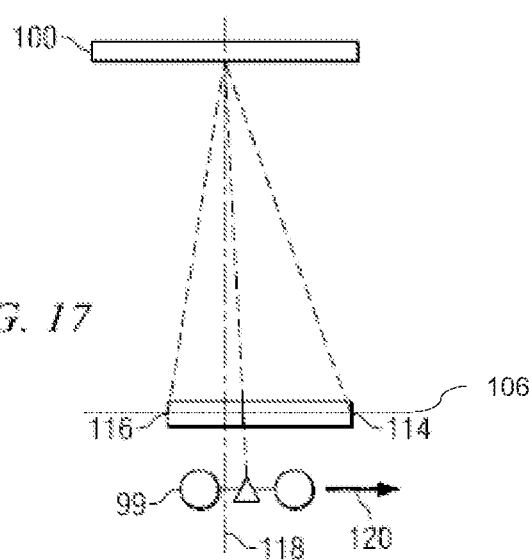
FIG. 17 is a schematic diagram illustrating in front view, different size windows for a moving observer, in accordance with the present disclosure.

FIG. 17 is a schematic diagram illustrating in front view, different size windows for a moving observer. FIG. 17 illustrates an example of control performed by the control system on the basis of the output of the sensor system, being in this example to change the number of optical windows in the viewing windows 114 and 116 in response to the speed or acceleration of the observer 99 in the lateral direction from the optical axis 118 of the display device 100 that is also the normal to the display device 100. In particular the number of optical windows is increased in response to the speed or acceleration of the observer 99 in the lateral direction exceeding a predetermined amount. In an illustrative example, the predetermined amount may be a speed of 0.05 ms$^{-1}$ or an acceleration of 0.05 ms$^{-2}$. For example, at speed below 0.05 ms$^{-1}$, a viewing window 116 may comprise four optical windows of pitch 10 mm. At the predetermined speed and/or acceleration five optical windows may be illuminated in the viewing window 116 for the left eye. The increase in the number of optical windows at the predetermined speed may be the same for the right eye viewing window 114. Further, at a second predetermined speed of 0.1 ms$^{-1}$, additional optical windows may be illuminated in the viewing window 114 in the direction 120 of travel while the trailing viewing window 116 may have the same number of optical windows as for the case of speed greater than 5 ms$^{-1}$ so that viewing window 116 comprises five optical windows and viewing window 114 comprises seven optical windows. Further, FIG. 17 shows in front view, an example of the observer 99 moving rapidly in direction 120 lateral to the optical axis 118 of display device 100. In the case that the speed or acceleration exceeds a predetermined amount, the windows 114 and 116 are "opened up" to include an increased number of optical windows, so that the observer 99 remains substantially within the viewing windows 114 and 116 may be made much larger. Viewing window 116 may be increased up to or just beyond the nose location without substantially increasing the crosstalk. Further, the viewing window size may be increased in the direction of motion. Note that it is possible for the viewing windows 114 and 116 to at least partially spatially overlap as they are illuminated at different times. This may particularly be the case for a moving observer 99.

Figure 18:
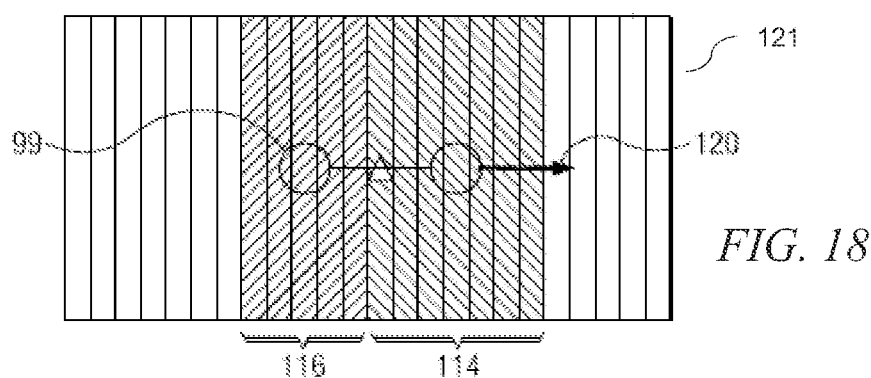
FIG. 18 is a schematic diagram illustrating the arrangement of viewing windows for an observer moving in a first direction, in accordance with the present disclosure.
Figure 19:
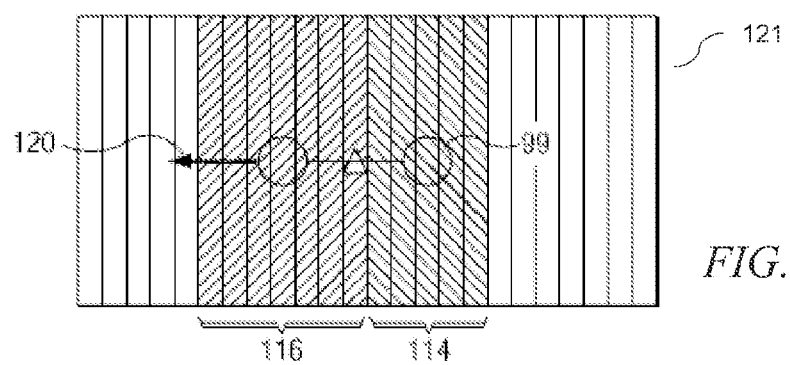
FIG. 19 is a schematic diagram illustrating the arrangement of viewing windows for an observer moving in a second direction opposite to the first direction, in accordance with the present disclosure.

FIG. 18 is a schematic diagram illustrating the arrangement of viewing windows for an observer moving in a first direction and FIG. 19 is a schematic diagram illustrating the arrangement of viewing windows for an observer moving in a second direction opposite to the first direction. Further, FIG. 18 shows schematically the structure of the optical window array 121 corresponding to FIG. 17 and FIG. 19 illustrates a window structure at the same spatial location of the observer 99 when the movement direction 120 of the observer is reversed.

Advantageously the number and arrangement of optical windows which may form each viewing window 114, 116 may be changed depending on any or all of the location, velocity and acceleration of the observer 99. In this way the eyes of the observer 99 may be kept substantially within the viewing windows so that flicker effects may be reduced. Similarly the size of the viewing windows may be reduced as the observer slows or becomes stationary, for example, as shown in FIG. 15. Reducing the viewing window width may improve the crosstalk performance of the display and advantageously may also reduce power consumption. A parameter to set each user's tradeoff between crosstalk and flicker may be provided. Advantageously this can tune display parameters to suit user preferences. Optionally this adjustment may be automatic and set to vary with the type of images being shown. Further, if for example, a vision system is used as the tracking sensor, the display may recognize and identify individual users, so that the display properties may be tuned to suit that particular user at future times. High contrast slow moving images may provide low crosstalk and fast moving low contrast images may provide a higher crosstalk tolerance.

Figure 20:
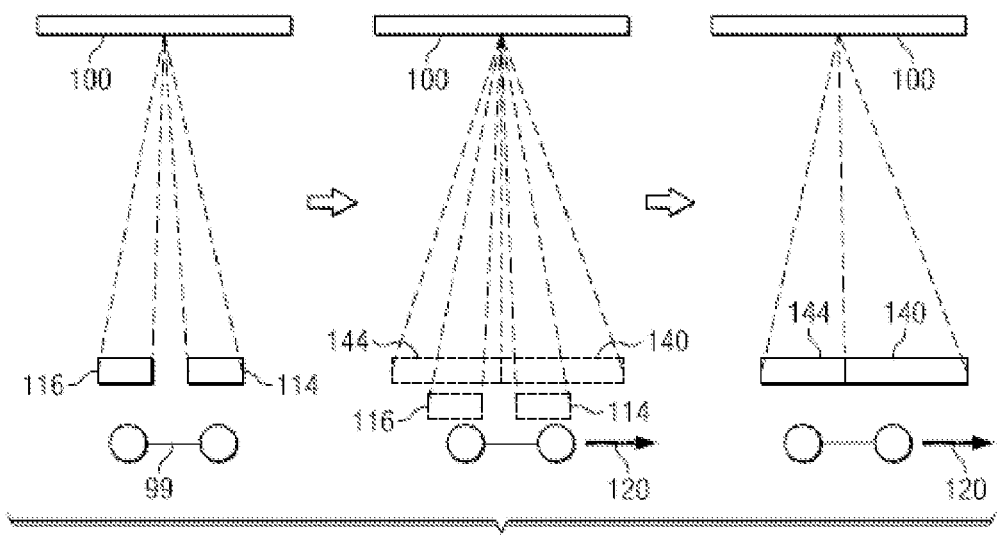
FIG. 20 is a schematic diagram illustrating in front view, a first arrangement of viewing windows for an accelerating observer, in accordance with the present disclosure.

FIG. 20 illustrates another example of control performed by the control system on the basis of the output of the sensor system, being in this example to change the number of optical windows in the viewing windows 114 and 116 in response to the speed or acceleration of the observer 99 in the lateral direction from the optical axis 118 of the display device 100 that is also the normal to the display device 100. In particular the number of optical windows is increased in response to the speed or acceleration of the observer 99 in the lateral direction exceeding a predetermined amount. FIG. 20 is a schematic diagram illustrating in front view, a first arrangement of viewing windows for an accelerating observer. Further, FIG. 20 shows schematically in front view, one transition of viewing windows for an observer changing from a stationary to a moving phase of operation. 'Low speed' size viewing windows 114, 116 may be used when the observer is not moving or slowly moving and a set of larger viewing windows 144 and 140 including an increased number of optical windows may be selected when the observer is moving at high speed or accelerating.

Figure 21:
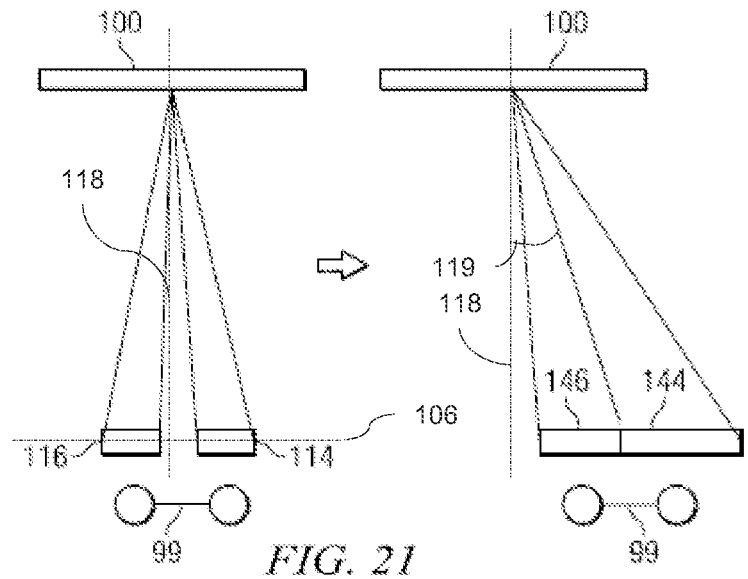
FIG. 21 is a schematic diagram illustrating in front view, increasing window size at the edge of the viewing region, in accordance with the present disclosure.
Figure 22:
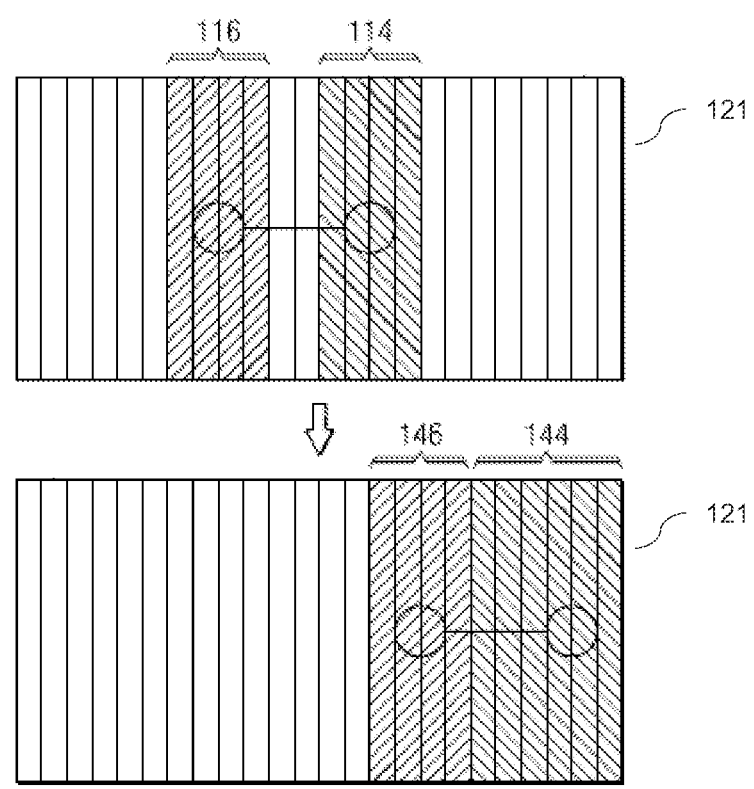
FIG. 22 is a schematic diagram illustrating schematically an arrangement of viewing windows for FIG. 21, in accordance with the present disclosure.

FIG. 21 illustrates an example of control performed by the control system on the basis of the output of the sensor system, being in this example to change the number of optical windows in the viewing windows 114 and 116 in response to the detected position of the observer 99 in the lateral direction to the optical axis 118 of the display device 100 that is also the normal to the display device 100. In particular, the number of optical windows is increased in response to the observer 99 being in a position displaced in the lateral direction away from the normal to the display device 100 by a predetermined amount. In an illustrative example, the viewing windows may each comprise five optical windows each of nominal pitch in the window plane 106 of 10 mm. When the most off-axis eye of the observer is arranged at an angle 119 of 20° (that may be the predetermined amount) to the normal 118 to the device 100, then the viewing window 146 may comprise six optical windows and the viewing window 144 may comprise eight optical windows. FIG. 21 is a schematic diagram illustrating in front view, increasing viewing window size at the edge of the viewing region. Further, FIG. 21 shows schematically in front view, how the conventional viewing windows 114 and 116 may be varied in size (that is the number of optical windows forming a viewing window) depending on the position of the observer 99 in the direction relative to the normal to the display device 100, in particular increasing the number of optical windows forming viewing windows 144 and 146 in positions laterally displaced to the normal to the display device 100 when the observer 99 is in a position displaced in the lateral direction by a predetermined amount. As the observer 99 moves off-axis the aberrations in the optical windows of the array 121 may increase resulting in a distorted optical window image. FIG. 22 illustrates this in the window plane. Further, FIG. 22 is a schematic diagram illustrating schematically an arrangement of viewing windows for FIG. 21. The optical window array structure in FIG. 21 illustrates the nominal position of the optical windows rather than the actual light distributions. Alternatively, the optical window blurring may increase off-axis so that the number of optical windows that may be illuminated may be reduced to compensate for window structure blurring, as the windows are present over a larger lateral position.

FIGS. 21 and 22 first illustrate the case of an observer 99 in a first position relative to a display device 100 disposed on the normal to the display device 100. The display device 100 may provide a first pair of left and right eye viewing windows 114, 116, as shown. FIGS. 21 and 22 then illustrate the case of an observer 99 in a second position relative to the display device 100 which is laterally displaced from the normal to the display device 100, in this example slightly to the right of the normal to the approximate center of the display device 100. Stated differently, the second position of the observer 99 relative to the display device 100 is shifted to the right of the display device 100. In this case, the display device 100 may then provide a second pair of left and right eye viewing windows 146, 144 which are also directed to the right of the display device 100. The second pair of left and right eye viewing windows 146, 144 formed of an increased number of optical windows compared to the first pair of left and right eye viewing windows 114, 116. This illustrates that the viewing windows may vary in size depending on the lateral position of the observer 99 relative to the display device 100. In FIG. 21, the viewing window 144 may be larger than the viewing window 146 in a similar manner to the case of FIG. 18 discussed above. Additionally, as the observer 99 changes position to the left relative to the display 100, the left eye viewing window may become larger than the right eye viewing window.

Advantageously increasing the size of the optical window array 144 at or near to the edge of the viewing region may somewhat compensate for the aberrations of the optical window images and thereby reduce the appearance of unwanted image flicker, particularly due to the appearance of field aberrations at the output of the optical system.

Figure 23A:
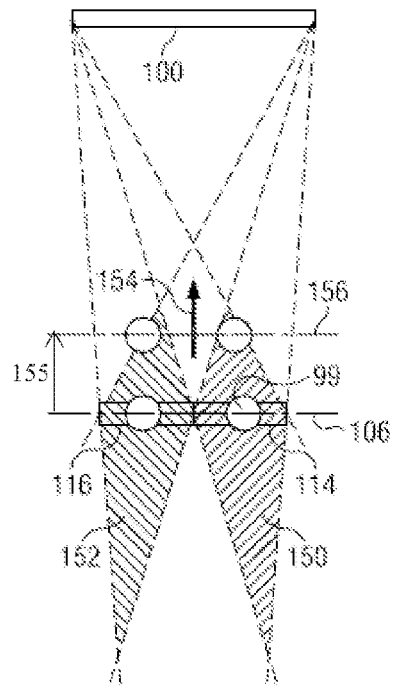
FIG. 23A is a schematic diagram illustrating in front view, a first arrangement of viewing regions from an autostereoscopic display device, in accordance with the present disclosure.
Figure 23B:
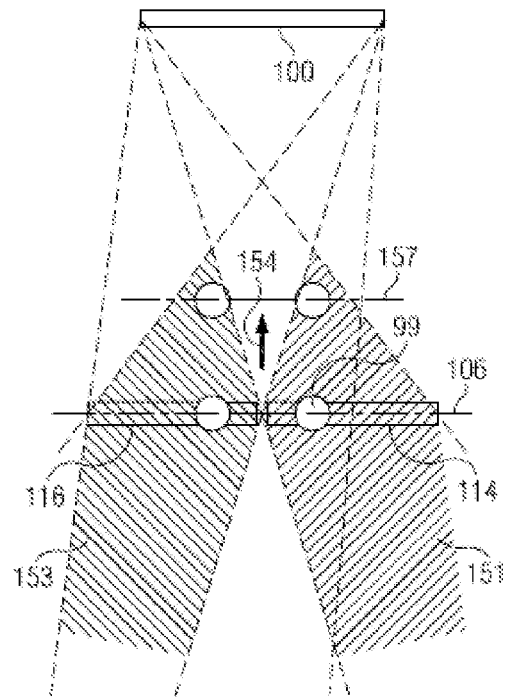
FIG. 23B is a schematic diagram illustrating in front view, an alternative arrangement of viewing regions from an autostereoscopic display device, in accordance with the present disclosure.

FIGS. 23A and 23B illustrate another example of control performed by the control system on the basis of the output of the sensor system, being in this example to change the number of optical windows in the viewing windows 114 and 116 in response to the detected position of the observer 99 along the normal to the display device 99. In particular the number of optical windows is increased in response to the detected position of the observer 99 being in a position displaced along the normal to the display device 100 away from a nominal window plane by a predetermined amount towards the display device 100. FIG. 23A is a schematic diagram illustrating in front view, a first arrangement of viewing regions from an autostereoscopic display device. Further, FIG. 23A illustrates in front view, the diamond shape viewing regions 152, 150 corresponding to the viewing windows 116, 114 in the window plane 106. Note that as the observer 99 moves in the direction 154 displaced along the normal to the display device 100 from the window plane 106 and towards the display device 100, the lateral width of the viewing regions may decrease until approximately at location 156 there may be little to no viewing freedom. This is achieved by the control effected by the control system in selecting the number of optical windows in a viewing window.

FIG. 23B is a schematic diagram illustrating in front view, an alternative arrangement of viewing regions from an autostereoscopic display device. Further, FIG. 23B shows that by increasing the size of the viewing window in the window plane (that is the number of optical windows forming a viewing window), the viewing freedom in the direction 154 may be increased, for example, in response to detecting the observer 99 moving towards the display device 100 by a predetermined amount to approximately location 157. Advantageously the embodiments of the present disclosure may achieve wider viewing window width than can be conveniently achieved in spatially multiplexed displays without increasing the overlap between viewing windows in the interocular region.

In other words, FIG. 23A illustrates the formation of viewing windows in the case of an observer 99 in a first position relative to a display device 100 disposed on the window plane 106. In this case, the display device 100 may provide a first pair of left and right eye viewing windows 114, 116, as shown. FIG. 23B illustrates the formation of viewing windows in the case of an observer 99 in a second position relative to the display device 100 which is displaced along the normal to the display device 100 from the window plane 106, in this example towards the display device 100 to position 157. In this case, the display device 100 may then provide a second pair of left and right eye viewing windows 114, 116 which are formed of an increased number of optical windows compared to the first pair of left and right eye viewing windows 114, 116 shown in FIG. 23A. This illustrates that the viewing windows may vary in size depending on the longitudinal position of the observer 99 relative to the display device 100 along the normal to the display device 100.

In an illustrative example, a display of width 300 mm may be arranged with a nominal viewing distance between the display device 100 and the window plane 106 of 500 mm. In the window plane, each viewing window 114, 116 may comprise eight optical windows. When the observer reaches viewing plane 156 at a distance 155 of 100 mm (that may be the predetermined amount), then the number of optical windows in each viewing window 114, 116 may be increased to nine.

Advantageously, the size of the viewing windows 114, 116 may be varied to increase the longitudinal viewing freedom in the direction 154 towards the display device 100, not just laterally as shown in FIG. 20. Similar advantage may be achieved by controlling the size of the viewing windows 114, 116 in the same manner when the observer 99 is displaced along the normal to the display device 100 from the window plane 106 away from the display device 100, although this is not essential, and the control may only be performed when the observer 99 is displaced towards the display device 100.

This is achieved by the control effected by the control system in selecting the number of optical windows in a viewing window. This control in the case of the detected position of the observer 99 being displaced longitudinally along the normal to the display device 100 may be an alternative, or may be performed in addition to the control in the case of the detected position of the observer 99 being laterally displaced from the normal to the display device 100, for example as described with reference to FIG. 20, so that the left and right images are directed into viewing windows which may include a number of optical windows that is increased in both the cases of the detected position of the observer 99 being displaced longitudinally and laterally.

In a similar manner to previously described, the size of the viewing window may be adjusted during longitudinal tracking to increase viewing freedom. Advantageously reduced cross talk near to the window plane 106 may be achieved by smaller windows as shown in FIG. 23A, whereas for viewing distances away from the window plane, further optical windows may be illuminated to enhance longitudinal viewing freedom. The switching of the optical windows between the observer locations may be achieved by control of discrete illuminator elements of the illuminator array 15.

Importantly in these optical valve embodiments and by way of comparison with spatially multiplexed displays, the number of optical windows constituting a window may be adjusted without reducing the spatial resolution of display device 100.

Figure 23C:
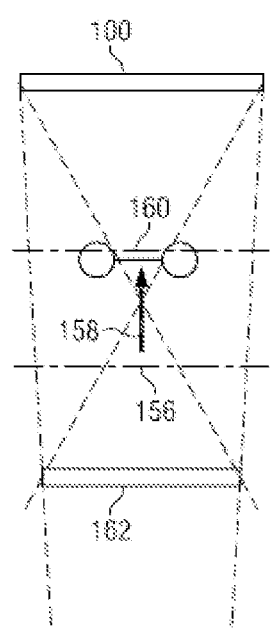
FIG. 23C is a schematic diagram illustrating in front view, switching to a single 2D window for an observer too close to an autostereoscopic display device for autostereoscopic viewing across the whole of the display width, in accordance with the present disclosure.

FIG. 23C is a schematic diagram illustrating in front view, switching to a single 2D window for an observer too close to an autostereoscopic display device for autostereoscopic viewing across the whole of the display width. Further, FIG. 23C shows in front view, an embodiment in which the observer 99 has moved in a direction 158 along the normal to the display device 100 beyond location 156 to location 160. At this point, it may not be possible for an observer 99 to see an autostereoscopic image across the whole of the display area of the display device 100. However, if more or all of the optical windows of the optical window array 121 are switched on and a single image is presented on the spatial light modulator 48 of the display device 100, then a 2D image may be comfortably viewed. Such an embodiment advantageously may provide a substantially seamless transition between autostereoscopic viewing and 2D viewings beyond the extremes of autostereoscopic viewing.

Advantageously the mechanism previously described can be used to switch to 2D viewing before location 156 is reached, if for example, the image disparity between left and right images may make fusing of the stereo pair difficult. Further it may be possible for the location in direction 158 that switching occurs may vary with the type of image display. Specifically it may be image disparity dependent and/or observer dependent. Advantageously this may achieve a display that may produce comfortable and appropriate images for a range of observers with different visual accommodation ranges.

Figure 23D:
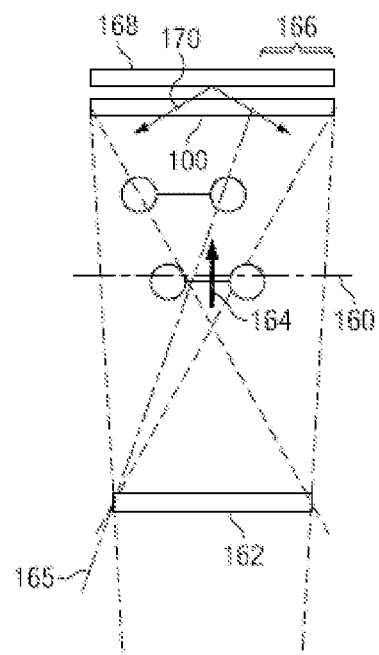
FIG. 23D is a schematic diagram illustrating in front view, switching to a 2D backlight illumination for an observer too close to an autostereoscopic display device for autostereoscopic viewing across the whole of the display width, in accordance with the present disclosure.

Moving closer to the display device 100 than location 160 may result in the edge of the display starting to appear dark. FIG. 23D shows an embodiment in which a further 2D backlight arrangement 168 is provided and may be activated for an observer closer than location 160. FIG. 23D is a schematic diagram illustrating in front view, switching to a 2D backlight illumination for an observer too close to an autostereoscopic display device for autostereoscopic viewing across the whole of the display width. Backlight 168 may produce light in directions 170 which may achieve a fill in the edges of the display device 100 which may not be illuminated by the illuminator array 15 of FIG. 12 when, for example, the observer 99 moves in direction 164 closer to display device 100 than the location 160.

Advantageously the display apparatus including the display device 100 may process the user location to turn on additional 2D backlight when the observer 99 is approximately between display device 100 and location 160, so that the edges of the display may remain illuminated and the comfortable viewing freedom further increased.

Figure 23E:
FIG. 23E is a schematic diagram illustrating a method of indicating to the observer they are too close to an autostereoscopic display device, in accordance with the present disclosure.

FIG. 23E is a schematic diagram illustrating a method of indicating to the observer they are too close to an autostereoscopic display device. Further, FIG. 23E illustrates an example action that may be taken in response to the observer approaching too close to the screen such as displaying an on screen message. Alternatively the display device may go black or white, or fade to black or white, or low contrast image for example, or any combination thereof. In a further embodiment the display device may make an audible indication such as a beep.

Figure 23F:
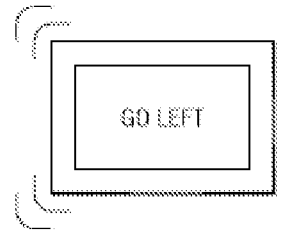
FIG. 23F is a schematic diagram illustrating a method of indicating to the observer they are too off-axis with respect to the viewing of an autostereoscopic display device, in accordance with the present disclosure.

FIG. 23F is a schematic diagram illustrating a method of indicating to the observer they are too off-axis with respect to the viewing of an autostereoscopic display device. Further, FIG. 23F shows another example of how the display apparatus may take action as the observer is detected as moving too far to the right for example. As well as the options described for FIG. 23E, the display device may be made to vibrate, for example, using an eccentrically weighted motor, when the observer approaches a defined position such as the limit of viewing freedom. Advantageously the vibration mode fits well with display devices that are hand held or are operated from a hand-held console or device. Furthermore, the observer location detection means may achieve increased viewing freedom and viewing range of the display device, furthermore it may also be used to notify the observer that the range has been exceeded.

Figure 24A:
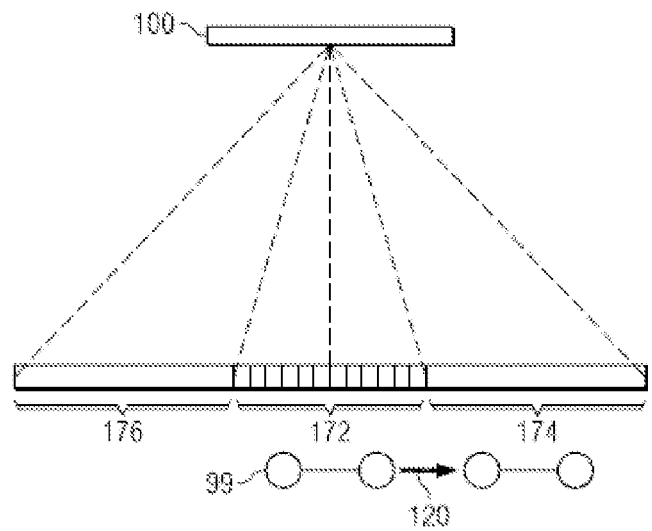
FIG. 24A is a schematic diagram illustrating in front view, an autostereoscopic display device with 2D viewing regions outside an autostereoscopic 3D viewing region, in accordance with the present disclosure.

FIG. 24A is a schematic diagram illustrating in front view, an autostereoscopic display device with 2D viewing regions providing a 2D image display outside an autostereoscopic 3D viewing region providing a 3D image display. Further, FIG. 24A shows an embodiment in which the observer 99 moves in a direction 120 beyond the range 172 of the acceptable 3D autostereoscopic image performance of the display device 100. In response to detection of the position of the observer 99, in regions 174, 176 the optical window array 121 may be adjusted to achieve a 2D image display for the observer. For example, the illuminator array 15 of FIG. 12 may include non-segmented illumination regions to either side of the array of illuminator elements.

As described above, the autostereoscopic display device may include a control system arranged to control the SLM 48 and to operate the light sources to direct light into viewing windows. The viewing windows may include at least one optical window in positions corresponding to left and right eyes of an observer, in dependence on the detected position of the observer. The control system may be arranged to provide a 3D image display in response to the detected position of the observer being in a predetermined region.

For example, as illustrated in FIG. 24A, a 3D image display may be provided in response to the observer 99 being in region 172 that is approximately centrally located with respect to the display device 100. In FIG. 24A when the observer 99 is in the region 172, the display device may provide a 3D image display to the observer 99. The 3D image display may be provided by controlling the SLM 48 to modulate light with temporally multiplexed left and right images and substantially synchronously operating the light sources to direct the left and right images into the viewing windows in positions corresponding to left and right eyes of an observer.

Additionally, the control system may be arranged to provide 2D image display in response to the detected position of the observer being in a position outside the predetermined region 172, for example in regions 174 and 176. The 2D image display may be provided by controlling the SLM 48 to modulate light with a 2D image and operating the light sources to direct that 2D image into the viewing windows in positions corresponding to left and right eyes of an observer. For example and as illustrated in FIG. 24A, a 2D image display may be provided in response to the observer 99 moving to the right in the direction 120. Once the observer 99 is in a position outside the predetermined region 172, the observer may view a 2D image in either of regions 174, 176.

In the example of this embodiment, the predetermined region 172 may be primarily a central range of lateral positions relative to the normal to the display device 100. As an alternative illustrated in the example illustrated in FIG. 23C and described above, the predetermined region may be a range of longitudinal positions relative to the normal to the display device 100. Alternatively the control may be provided in response to lateral and longitudinal movement so that the predetermined region may be a central area of lateral and longitudinal positions relative to the normal to the display device 100.

Advantageously this may achieve an alternative to switching the image black as the 3D range is exceeded and may achieve a wide viewing freedom display that ensures that when 3D is viewed the images are of high quality.

Figure 24B:
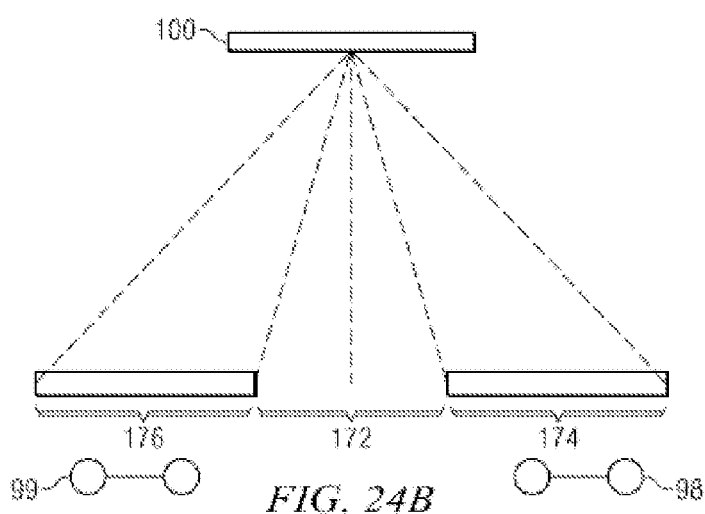
FIG. 24B is a schematic diagram illustrating two observers which may be located in different 2D windows, in accordance with the present disclosure.

FIG. 24B is a schematic diagram illustrating two observers which may be located in different 2D windows. Further, FIG. 24B shows another embodiment in which two observers 99 and 98 may be located in different 2D windows 176, 174. Unlike in FIG. 24A, a central 3D image may not be provided in region 172, which may be black.

Advantageously this embodiment may achieve two different 2D image channels to be viewed over the whole screen simultaneously for two different observers, or different views in different spatial positions for the same observer.

Figure 24C:
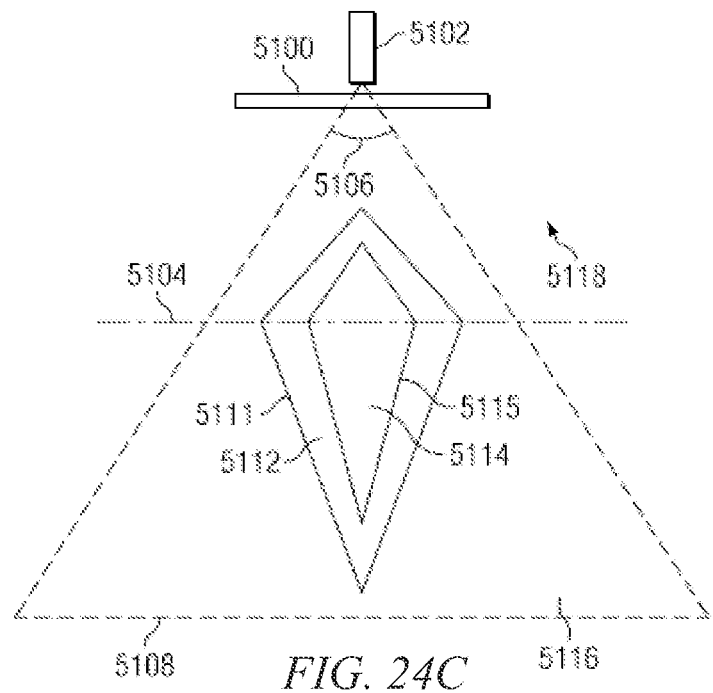
FIG. 24C is a schematic diagram illustrating regions of 3D and 2D image, in accordance with the present disclosure.

FIG. 24C illustrates schematically in top view an embodiment in which a directional autostereoscopic display apparatus 5100 comprises a directional display device and a control system. Camera 5102 may detect the position of an observer (not shown) within boundary 5108 over a region 5116 for example that may be defined by collection cone angle 5106 of the camera 5102. The display system 5100 may achieve an autostereoscopic viewing region 5114 with boundary 5115, representing an acceptable 3D viewing region 5114. An acceptable 3D viewing region may, for example, be a region in which the cross talk is below a certain value or in which the display uniformity is above a certain value for both eyes of a tracked observer.

As illustrated in FIG. 24C, the boundary 5115 may be a diamond or kite shaped. Outside boundary 5115, a region 5112 with boundary 5111 is provided, in which an acceptable 2D image may be seen across the display width (in which the display provides an image to multiple windows 26). An acceptable 2D viewing region 5112 may, for example, be a region in which the display uniformity is above a certain value for both eyes of an observer. As illustrated, window plane 5104 may be the approximate plane in which both 2D viewing region 5112 and 3D viewing region 5114 may be the widest.

In one embodiment, an autostereoscopic display device may include a transmissive SLM 48. The transmissive SLM 48 may include an array of pixels arranged to modulate light passing therethrough. The autostereoscopic display device may include a waveguide which may have an input end and first and second opposed guide surfaces for guiding light along the waveguide that extend from the input end across the SLM 48. The autostereoscopic display device may include an array of illuminator elements at different input positions across the input end of the waveguide. The waveguide may be arranged to direct input light, from light sources at the different input positions across the input end, as output light through the first guide surface for supply through the SLM 48 into optical windows in output directions. The output directions may be relative to the normal to the first guide surface and may be primarily dependent on the input positions. The autostereoscopic display may also include a sensor system arranged to detect the position of an observer relative to the display device and a control system. The control system may be arranged to control the SLM 48 and to operate the light sources to direct light into viewing windows. The viewing windows may include at least one optical window in positions corresponding to left and right eyes of an observer, in dependence on the detected position of the observer. The control system may also be arranged to provide a 3D image display in response to the detected position of the observer being in a predetermined region. The 3D image display may be provided by controlling the SLM 48 to modulate light with temporally multiplexed left and right images and synchronously operating the light sources to direct the left and right images into viewing windows in positions corresponding to left and right eyes of an observer. The control system may be further arranged to provide a 2D image display in response to the detected position of the observer being in a position outside the predetermined region. The 2D image display may be provided by controlling the SLM 48 to modulate light with a 2D image and operating the light sources to direct that 2D image into viewing windows in positions corresponding to left and right eyes of an observer. In one example, the predetermined region may be an approximate range of longitudinal positions relative to the normal to the display device 100. In another example, the predetermined region may be a central area of lateral and longitudinal positions relative to the normal to the display device 100.

The predetermined region for 3D viewing may be a region over which both eyes of an observer may see respective images of an autostereoscopic image with acceptable levels of image quality. Image quality may include but not limited to assessment of cross talk, image uniformity and image flicker for a moving observer. Such acceptable limits may be determined for example by measurement of display characteristics combined with knowledge of human psychophysical requirements. In an illustrative embodiment, a display may have a width of the region 5114 in the window plane 5104 of +/−25 degrees with a width of region 5112 in the window plane 5104 of +/−50 degrees. The collection cone angle 5106 of the camera 5102 may thus be set to be +/−50 degrees or greater. In a further illustrative embodiment, a 15" diagonal display with a 500 mm window plane distance may achieve a 3D image in a region with lateral width in the window plane of +/−150 mm and a longitudinal viewing freedom on-axis of +/−100 mm. Outside the boundary defined by these parameters, a 2D image may be presented.

In a temporally multiplexed display system, a 2D image can be achieved by phasing multiple light emitting elements of the illuminator array 15 in synchronization with one of the images displayed on the SLM 48. Advantageously, the control system may not interact with the graphics system of the display system 5100. Further, to reduce the flicker artifact at the transition from 3D to 2D viewing the brightness of the 2D image can be arranged to be substantially the same as the brightness of the 3D image. Alternatively the SLM 48 may display just one image for both illumination phases, or a 2D image in a first phase and a black image in a second phase.

Continuing the discussion of FIG. 24C, outside the boundary 5111, the image may have an artifact of some form and so the display may be switched to show, for example, a black or an unilluminated image in region 5116. Advantageously, the display illumination may be switched off for these viewing regions. Further advantageously if the observer, for example, in region 5118 is detected within the region 5116 but outside regions 5114, 5112, the display may be switched off or to a power saving "green mode". If no observer is detected by the camera, the display may be set to black or may be set to a low power 2D mode, for example, so that the display continues to function in the event of a camera sensing error.

Advantageously the camera 5102 and tracking system may cooperate with the display 5100 so that the displayed image and respective illumination may be modified in response to the determined position of the observer. As a result, the observer may see an appropriate image substantially without undesirable artifacts. The display may automatically switch on when the observer re-enters the sensing volume. The display may turn off the illumination when an observer in the sensing volume 5108 turns to look away from the display and re-illuminate the display automatically when they look back further reducing power consumption. Within the sensing volume 5116, the camera 5102 may cooperate with the display 5100 to implement the same or a different shaped viewing zone to the kite shaped boundary 5111 for example to produce a reduced viewing region privacy display.

Figure 24D:
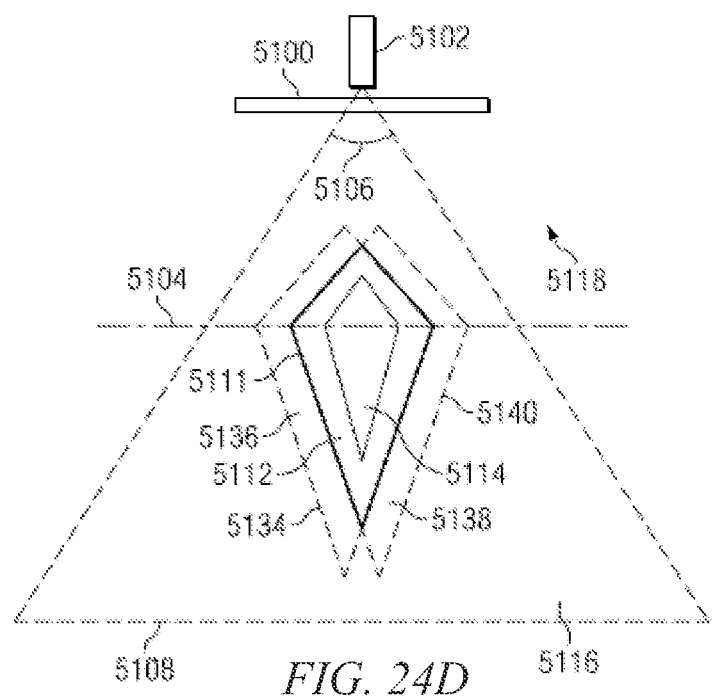
FIG. 24D is a schematic diagram illustrating regions of 3D and 2D image, in accordance with the present disclosure.

FIG. 24D illustrates schematically in top view a further embodiment in which an autostereoscopic directional display apparatus 5100 comprises a directional display device and a control system. Outside 2D viewing region 5112, in which both eyes see substantially the same image, further regions 5136, 5138 with respective outer boundaries 5134, 5140 are provided. When the measured observer position, which for example may be referenced to the nose position or may be an eye position, crosses the boundary 5111, one of the stereoscopic pair images is switched off, while the other remains switched on. As discussed previously, switching of the image may be achieved by switching of the respective light source or by switching of the image on the SLM 48 or both. Specifically, when the measured observer position passes the boundary 5111 moving towards the left, the left eye image may be switched off in region 5136, whereas the right eye may remain switched on. Similarly in the region 5138, the right eye image may be switched off while the left eye image may remain switched on. Outside the boundaries 5134, 5140 both images may be switched off.

In operation, an observer moving to the left will see the left eye image switch off before the right eye image. Such an effect is similar to the experience of moving to the left of a window frame; thus the perceived image will remain with substantially similar brightness. Further, the transition from 2D images to 3D will take place less abruptly and may provide an enhanced user experience. Advantageously in optical valves the observer does not see artifacts such as imaged triangle artifacts (described in FIG. 64), or fringe boundaries for limited width illuminators. In other display systems such as lenticular display systems, the observer does not perceive the increased cross talk and image blur at the larger viewing angles experienced by the most off-axis eye.

Advantageously, the present embodiments achieve an extended viewing freedom for a given illumination system, and may typically achieve approximately 130 mm additional freedom at the window plane (for a typical interocular separation of 65 mm).

Figure 24E:
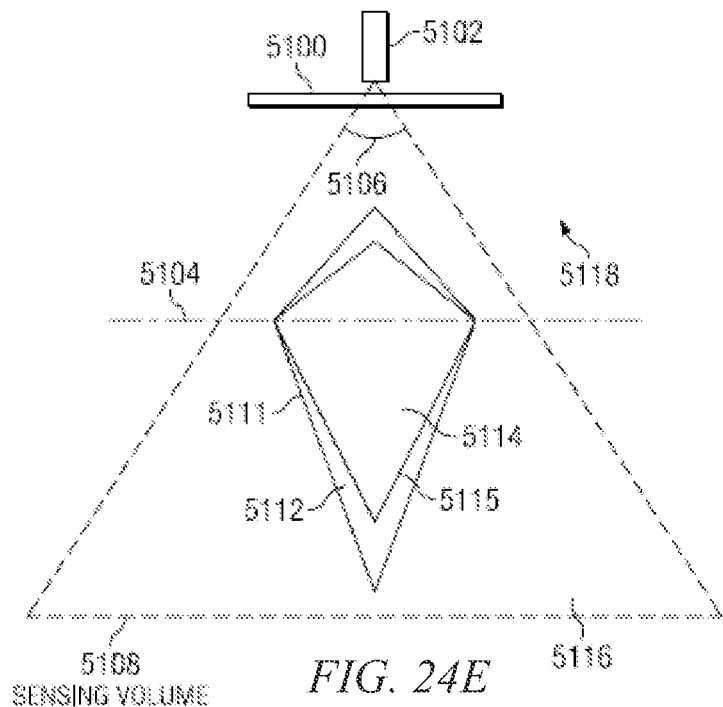
FIG. 24E is a schematic diagram illustrating a further arrangement of regions of 3D and 2D image, in accordance with the present disclosure.

FIG. 24E shows a further embodiment in which the 3D region 5114 and the 2D region 5112 have substantially the same width in the window plane 5104. Advantageously this may maximize the 3D viewing region for this type of display, while achieving an acceptable 3D viewing region and an extended longitudinal viewing freedom for 2D viewing.

Figure 24F:
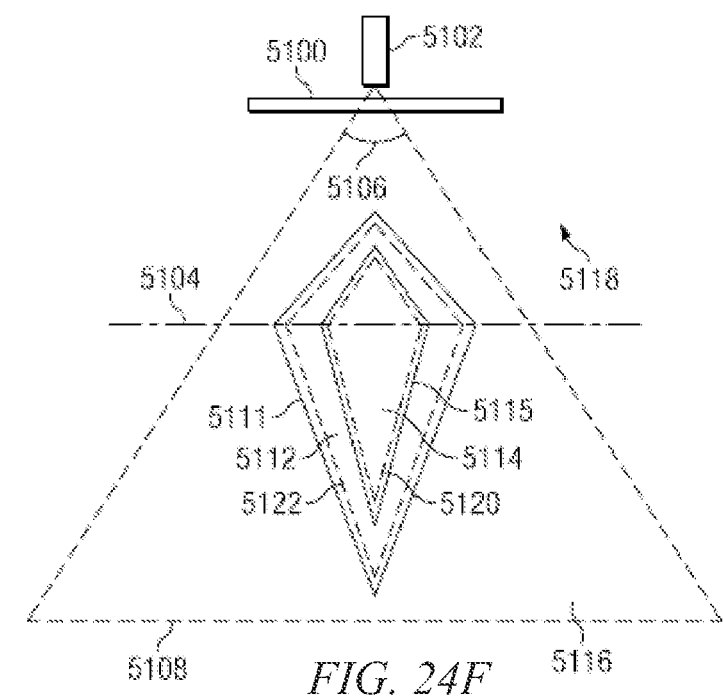
FIG. 24F is a schematic diagram illustrating a further arrangement of regions of 3D and 2D image, in accordance with the present disclosure.

FIG. 24F shows a further embodiment in which a controllable amount of hysteresis is introduced at the transition between regions 5112, 5114. For example the boundary to the 3D region 5114 may be at 5115 for an observer moving out of region 5114 and at 5120 for an observer moving into region 5114. Similarly the boundary to the 2D region 5114 may be at 5111 for an observer moving out of region 5112 into region 5116 and may be at 5122 for an observer moving into region 5112 from region 5116. Advantageously the hysteresis may reduce the amount of perceived display flicker seen at or near to the border of a respective region.

Figure 25A:
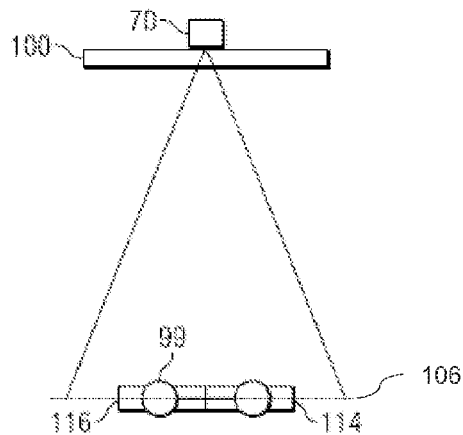
FIG. 25A is a schematic diagram illustrating in front view, autostereoscopic viewing windows produced by an autostereoscopic display when a tracking system has obtained lock on an observer, in accordance with the present disclosure.
Figure 25B:
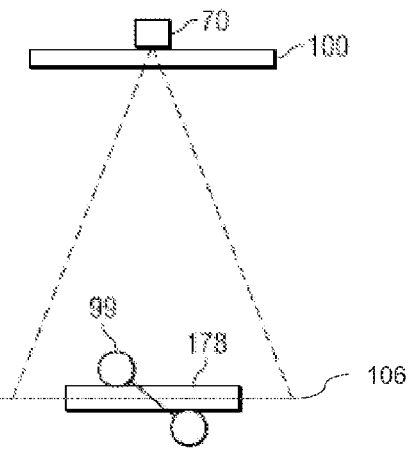
FIG. 25B is a schematic diagram illustrating in front view, a 2D viewing window produced by an autostereoscopic display device when a tracking system has lost lock on an observer, in accordance with the present disclosure.

FIG. 25A is a schematic diagram illustrating in front view, autostereoscopic viewing windows produced by an autostereoscopic display device when a tracking system has obtained lock on an observer, and FIG. 25B is a schematic diagram illustrating in front view, a 2D viewing window produced by an autostereoscopic display device when a tracking system has lost lock on an observer. Further, FIG. 25A shows the viewing windows 114, 116 which may be created for the observer 99 by the light steering system in response to the observer 99, observer detection sensor 70, control system 72 and illumination controller 74. In the front view, of FIG. 25B the observer 99 is shown turning to look away from the surface of the display device 100. This may be detected by the sensor 70, and in such case the display may be switched to 2D mode, for example by making a single large 2D window 178 in the window plane until such time as the observer looks back to the display device 100, and may be reacquired by the tracking system and 3D windows 114, 116 may be restored. The creation of large window 178 may also take place if the tracking system loses the observer's location, or if the error in the generation of the observer's eye location is subsequently determined by location measurements to have an error beyond a threshold value.

Figure 26:
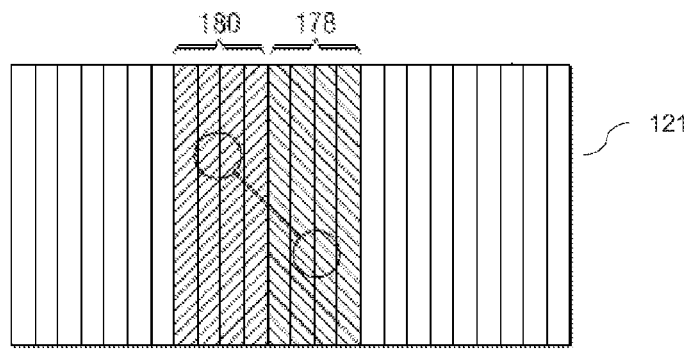
FIG. 26 is a schematic diagram illustrating schematically an arrangement of viewing windows for an observer with tilted eye positions with respect to the window orientation, in accordance with the present disclosure.

FIG. 26 is a schematic diagram illustrating schematically an arrangement of viewing windows for an observer with tilted eye positions with respect to the window orientation. Further, FIG. 26 shows an embodiment in which the optical window array 121 may change windows 114, 116 of FIG. 15 in response to further detected locations of the observer. In this embodiment the observer is shown at an angle to the optical windows and windows 180 and 178 may be adjusted to compensate. Further, in look-around systems, the image displayed on the SLM 48 may be adjusted to provide a stereoscopic perspective. Further the look-around may be adjusted to provide an exaggerated perspective in an at least one axis, for example the direction towards the display device 100. Advantageously the tracking and steering system may achieve a viewing freedom tolerant to a certain degree of head tilt.

Figure 27A:
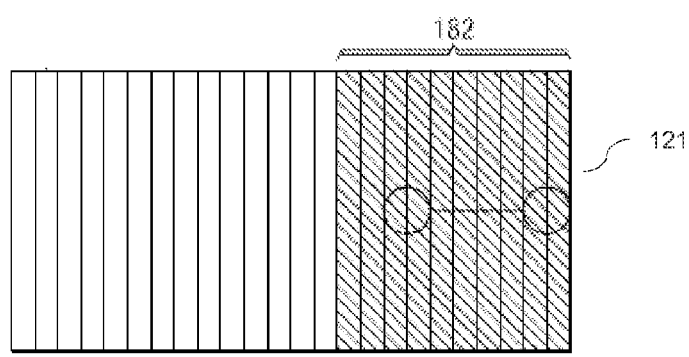
FIG. 27A is a schematic diagram illustrating a window arrangement if a defined viewing region for autostereoscopic 3D viewing is exceeded, in accordance with the present disclosure.

FIG. 27A is a schematic diagram illustrating a window arrangement if a defined viewing region for autostereoscopic 3D viewing is exceeded. Further, FIG. 27A shows an embodiment with an optical window array 121 suitable for the case when the tracking system detects that a large error or large uncertainty in the location of the observer 99. As previously explained, this may be done by comparing the generated location value for an eye at a future illumination pulse time with the subsequently received location at or near to that time. Advantageously, rather than show a possibly poor 3D image, a large 2D window 182 may be produced. When the tracking error is reduced the display may switch back to 3D. In this way viewing comfort may be maintained without noticeable flicker to the display.

Figure 27B:
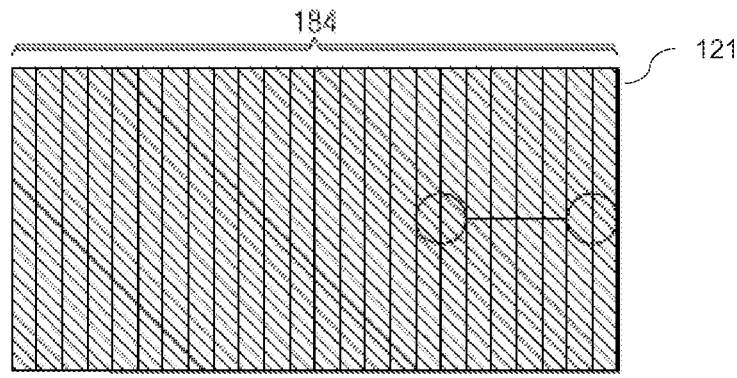
FIG. 27B is a schematic diagram illustrating a further window arrangement if a defined viewing region for autostereoscopic 3D viewing is exceeded, in accordance with the present disclosure.

As well as detecting the condition of high uncertainty or error in the observer's location, the tracking system may also detect loss of the location of the observer completely. This is a distinct case from the high error condition. This is the case when the observer turns around or even leaves. When this condition is detected the display device may advantageously be switched to have a very wide 2D window as shown at 184 in FIG. 27B. FIG. 27B is a schematic diagram illustrating a further window arrangement if a defined viewing region for autostereoscopic 3D viewing is exceeded. The display device may be set to automatically acquire or reacquire, as appropriate, the location of the observer and having done so, may switch the windows from pattern 184 back to those of FIG. 15 for example.

Figure 28A:
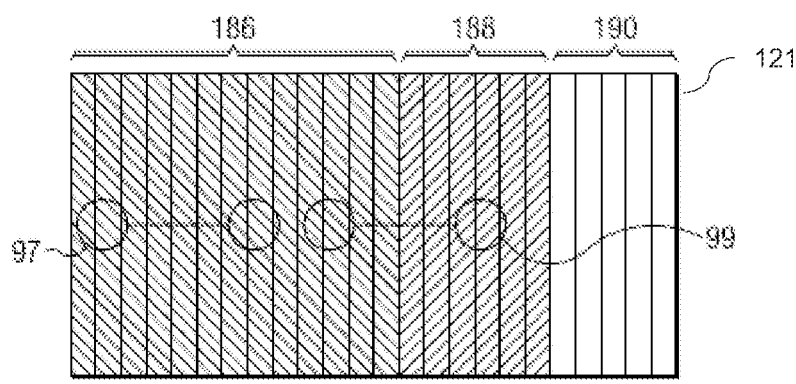
FIG. 28A is a schematic diagram illustrating a window arrangement for simultaneous 2D and 3D viewing by multiple observers, in accordance with the present disclosure.

FIG. 28A is a schematic diagram illustrating a window arrangement for simultaneous 2D and 3D viewing by multiple observers. Further, FIG. 28A shows an example in which more than one observer shares the display device. In this case the central observer 99 sees windows 188 and 186 and perceives a 3D image. The off axis viewer 97 may be located completely within window 186 and may view a 2D image. Region 190 may be switched off.

Figure 28B:
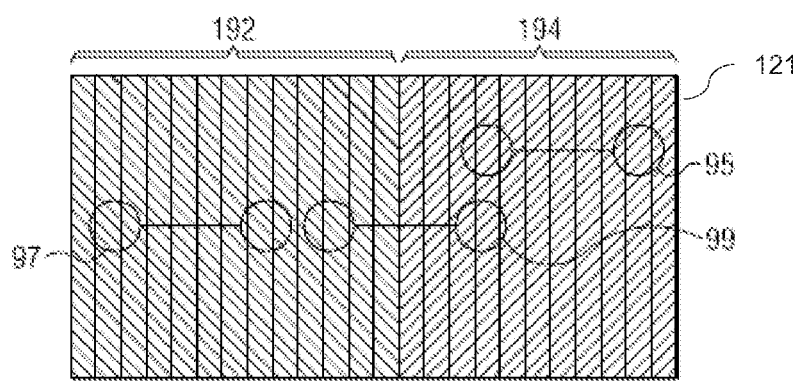
FIG. 28B is a schematic diagram illustrating an alternative window arrangement for simultaneous 2D and 3D viewing by multiple observers, in accordance with the present disclosure.

FIG. 28B is a schematic diagram illustrating an alternative window arrangement for simultaneous 2D and 3D viewing by multiple observers. Further, FIG. 28B shows another embodiment in which the windows 194 and 192 may be arranged to achieve a central 3D image for observer 99 and off axis viewing for two 2D observers 95, 97. Advantageously the same display device may achieve useful viewing for more than one observer, even though the number of available windows may be insufficient for reliable autostereoscopic viewing by all observers.

Figure 28C:
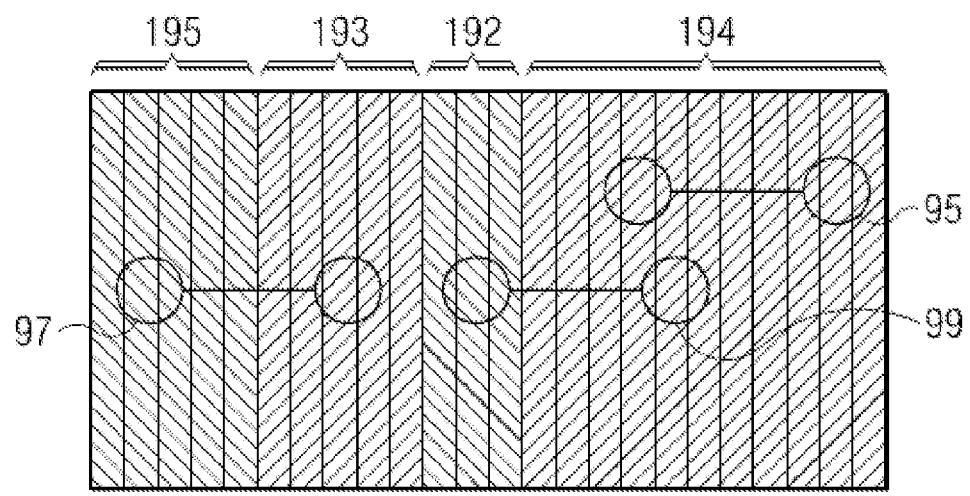
FIG. 28C is a schematic diagram illustrating an alternative window arrangement for simultaneous 2D and 3D viewing by multiple observers, in accordance with the present disclosure.

FIG. 28C is a schematic diagram illustrating an alternative window arrangement for simultaneous 2D and 3D viewing by multiple observers. Further, FIG. 28C shows that more than one observer may see a 3D image by providing multiple right eye windows 194, 193 and left eye windows 192, 195. The observers 95, 97, 99 may be cooperative with the display and each other. The observer tracking system may be able to detect such conflicts and take action. Such action may include giving direction suggestions to the observers or switching one or more observer to a 2D image. If the tracking system detects suitable conditions for autostereoscopic viewing, the 3D mode may be automatically re-engaged for one or more of the observers.

Figure 29:
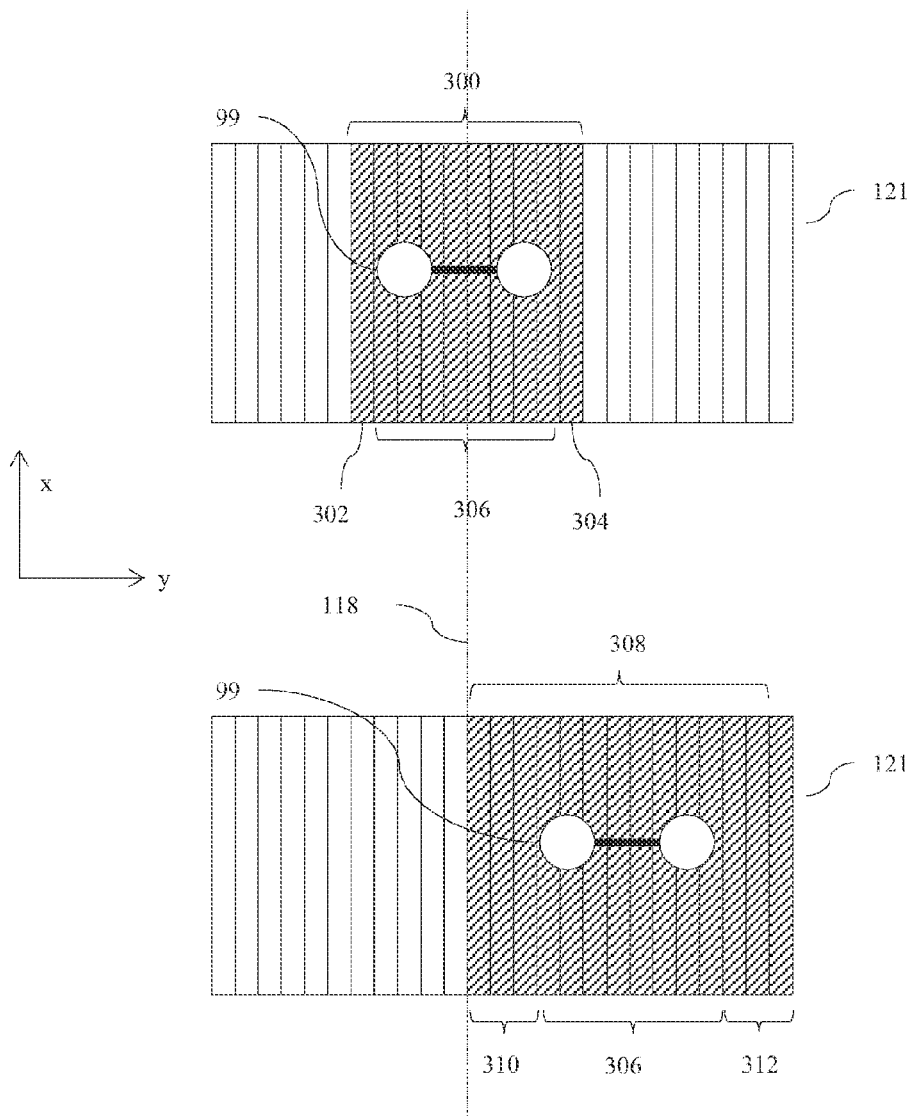
FIG. 29 is a schematic diagram illustrating alternative window arrangements for a 2D directional display system arranged to modify viewing window structure according to viewing position, in accordance with the present disclosure.

FIG. 29 is a schematic diagram illustrating alternative window arrangements for a 2D directional display apparatus arranged to modify viewing window structure according to viewing position. As described in FIG. 8 for example, such displays can be suitable for privacy modes of operation as well as high efficiency and high brightness. For an observer 99 positioned with nose substantially aligned with the optical axis 118 of the display system, viewing window 300 may be formed from an array of optical windows comprising central optical window array 306 and additional edge optical windows 302, 304 arranged to achieve uniform filling of the display area. As the observer moves to an off-axis position, viewing window 308 may comprise extended numbers of optical windows comprising groups 310, 312 that are larger in width than the optical windows 302, 304. Advantageously, the number of optical windows in each viewing position is minimized, optimizing display efficiency, while achieving filling of the SLM 48 and low flicker for a moving observer. Off-axis aberrations which degrade the reproduction of the optical windows are thus compensated.

Figure 30:
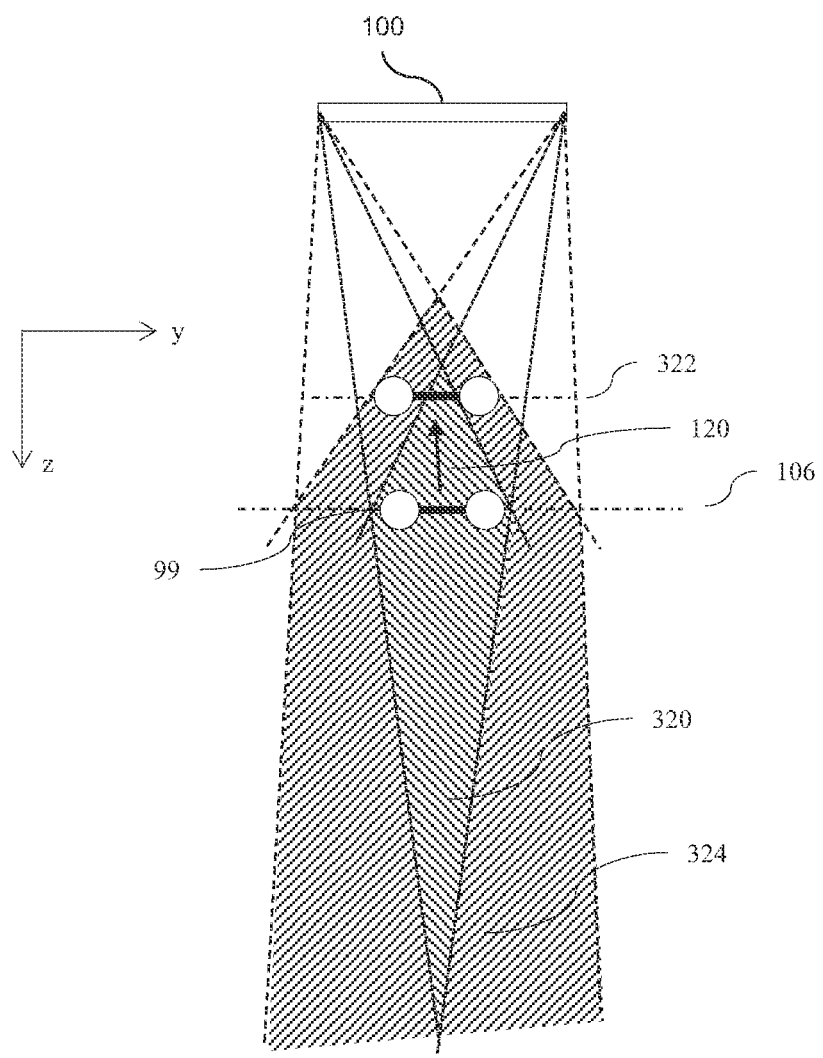
FIG. 30 is a schematic diagram illustrating alternative window arrangements for a 2D directional display system for different observer distances, in accordance with the present disclosure.

FIG. 30 is a schematic diagram illustrating alternative window arrangements for a 2D directional display apparatus for different observer distances. Thus viewing diamond 320 is provided by the control system for an observer 99 at the window plane 106, whereas diamond 322 may be produced for a closer observer at plane 322, achieving viewing region 324 (shown in part) and a wide width of intersection (representing the window width, and given by the number of optical windows) at the window plane 106. From geometric considerations, the width of the viewing window at the window plane 106 is required to increase as the observer moves closer to the display, in a similar manner to that shown in FIGS. 23A and 23B. Thus the number of illuminated optical windows can be minimized for a given viewing distance and lateral position, optimizing efficiency while achieving uniform display filling.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A directional display apparatus comprising:
a display device comprising:
a transmissive spatial light modulator comprising an array of pixels arranged to modulate light passing therethrough;
a waveguide having an input end and first and second, opposed guide surfaces for guiding light along the waveguide that extend from the input end across the spatial light modulator; and
an array of light sources at different input positions in a lateral direction across the input end of the waveguide, the waveguide being arranged to direct input light from light sources at the different input positions across the input end as output light through the first guide surface for supply through the spatial light modulator into respective optical windows in output directions distributed in the lateral direction in dependence on the input positions,
the directional display apparatus further comprising:
a sensor system arranged to detect the position of an observer relative to the display device; and
a control system arranged to operate the light sources to direct light into one or more viewing windows comprising at least one optical window, in dependence on the detected position of the observer,
wherein the control system is arranged to change the number of optical windows of the one or more viewing windows on the basis of the output of the sensor system and in response to the speed or acceleration of the observer in the lateral direction from the normal to the display device.

2. A directional display apparatus according to claim 1, wherein the control system is arranged to increasing the number of optical windows of the one or more viewing windows in response to the speed or acceleration of the observer in the lateral direction from the normal to the display device exceeding a predetermined amount.

3. A directional display apparatus according to claim 1, wherein the first guide surface is arranged to guide light by total internal reflection and the second guide surface comprises a plurality of light extraction features oriented to reflect light guided through the waveguide in directions allowing exit through the first guide surface as the output light.

4. A directional display apparatus according to claim 3, wherein the second guide surface has intermediate regions between the light extraction features that are arranged to direct light through the waveguide without extracting it.

5. A directional display apparatus according to claim 4, wherein the second guide surface has a stepped shape comprising facets, that constitute said light extraction features, and said intermediate regions.

6. A directional display apparatus according to claim 1, wherein the first guide surface is arranged to guide light by total internal reflection and the second guide surface is substantially planar and inclined at an angle to reflect light in directions that break the total internal reflection for outputting light through the first guide surface,
the display device further comprising a deflection element extending across the first guide surface of the waveguide for deflecting light towards the normal to the spatial light modulator.

7. A directional display apparatus according to claim 1, wherein the waveguide has a reflective end facing the input end for reflecting light from the input light back through the waveguide, the waveguide being arranged to output light through the first guide surface after reflection from the reflective end.

8. A directional display apparatus according claim 7, wherein the reflective end has positive optical power in the lateral direction.

9. A directional display apparatus according to claim 1, wherein the control system is further arranged to control the spatial light modulator to modulate light with temporally multiplexed left and right images and is arranged synchronously to operate the light sources to direct light modulated by the left and right images into left and right eye viewing windows comprising at least one optical window in positions corresponding to left and right eyes of an observer, in dependence on the detected position of the observer.

* * * * *